United States Patent
Wang et al.

(10) Patent No.: US 12,175,374 B1
(45) Date of Patent: *Dec. 24, 2024

(54) DISTRIBUTED GAUSSIAN PROCESS CLASSIFICATION COMPUTING SYSTEM

(71) Applicant: SAS Institute Inc., Cary, NC (US)

(72) Inventors: Yingjian Wang, Apex, NC (US); Xinmin Wu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,410

(22) Filed: Apr. 15, 2024

Related U.S. Application Data

(60) Provisional application No. 63/621,524, filed on Jan. 16, 2024, provisional application No. 63/618,574, filed on Jan. 8, 2024.

(51) Int. Cl.
| | |
|---|---|
| *G06N 3/098* | (2023.01) |
| *G06N 5/04* | (2023.01) |
| *G06N 20/10* | (2019.01) |
| *G06N 20/00* | (2019.01) |

(52) U.S. Cl.
CPC ............ *G06N 3/098* (2023.01); *G06N 5/04* (2013.01); *G06N 20/10* (2019.01); *G06N 20/00* (2019.01)

(58) Field of Classification Search
CPC ........ G06N 3/098; G06N 20/10; G06N 20/00; G06N 5/04
See application file for complete search history.

(56) References Cited

U.S. PATENT DOCUMENTS

| | | | |
|---|---|---|---|
| 10,872,277 B1 | 12/2020 | Wang | |
| 11,227,223 B1 | 1/2022 | Wang | |
| 2021/0365820 A1* | 11/2021 | Shabat | G06N 20/10 |
| 2022/0004932 A1* | 1/2022 | Gu | G06F 30/27 |
| 2023/0024035 A1* | 1/2023 | Thuerck | G06F 15/8046 |
| 2023/0145125 A1* | 5/2023 | Oyama | G06F 9/52 |
| | | | 708/520 |
| 2024/0104367 A1* | 3/2024 | Lin | H04B 17/3913 |

(Continued)

OTHER PUBLICATIONS

Bartels et al., "Adaptive Cholesky Gaussian Processes" Feb. 23, 2023, arXiv: 2202.10769v3, pp. 1-45. (Year: 2023).*

(Continued)

*Primary Examiner* — Miranda M Huang
*Assistant Examiner* — Chase P. Hinckley
(74) *Attorney, Agent, or Firm* — Bell & Manning, LLC

(57) ABSTRACT

A computing system trains a classification model using distributed training data. A first worker index and a second worker index are received from a controller device and together uniquely identify a segment of a lower triangular matrix. The first and second worker indices have values from one to a predefined block size value. In response to receipt of a first computation request from the controller device, a first kernel matrix block is computed at each computing device based on the first worker index and the second worker index. In response to receipt of a second computation request from the controller device, an objective function value is computed for each observation vector included in an accessed training data subset. The computed objective function value is sent to the controller device. Model parameters for a trained classification model are output.

30 Claims, 19 Drawing Sheets

(56) References Cited

U.S. PATENT DOCUMENTS

2024/0231830 A1* 7/2024 Busato ............... G06F 9/30036
2024/0338419 A1* 10/2024 Lee ..................... G06N 20/10

OTHER PUBLICATIONS

Chen et al., "Randomly pivoted Cholesky: Practical approximation of a kernel matrix with few entry evaluations" Dec. 12, 2023, arXiv: 2207.06503v5, pp. 1-38. (Year: 2023).*

Charlier et al., "Kernel Operations on the GPU, with Autodiff, without Memory Overflows" Mar. 27, 2020, arXiv: 2004.11127v1, pp. 1-5. (Year: 2020).*

Bartels et al., "Kernel-Matrix Determinant Estimates from stopped Cholesky Decomposition" Jul. 22, 2021, arXiv: 2107.10587v1, pp. 1-37. (Year: 2021).*

Epperly et Moreno, "Kernel Quadrature with Ranomly Pivoted Cholesky" Dec. 7, 2023, arXiv: 2306.03955v3, pp. 1-19. (Year: 2023).*

Hu et al., "Giga-scale Kernel Matrix-Vector Multiplication on GPU" Oct. 12, 2022, arXiv: 2202.01085v3, pp. 1-22. (Year: 2022).*

Ballard, G., Demmel, J., Holtz, O., and Schwartz, O. Communication-optimal parallel and sequential Cholesky decomposition. SIAM Journal on Scientific Computing 32, 6 (2010), 3495-3523.

Carl Eduard Rasmussen and Christopher K.I. Williams, "Gaussian Processes for Machine Learning", MIT Press 2006, Chapter 3.

Sklearn GPC: printed from https://scikit-learn.org/stable/modules/gaussian_process.html?highlight=gaussianprocessclassifier printed on May 26, 2020, 2007-2019, scikit-learn developers (BSD License).

Wikipedia, Cholesky decomposition, retrieved from https://en.wikipedia.org/w/index.php?title=Cholesky_decomposition&oldid=958717026, last edited May 25, 2020.

Wikipedia, Error Function, retrieved from https://en.wikipedia.org/w/index.php?title+Error_function&oldid=959052386, printed Jun. 24, 2020.

Williams et al., "Bayesian Classification with Gaussian Process", IEEE Trans. Pattern Anal. Mach. Intell. 1998, vol. 20, No. 12, pp. 1342-1351.

Wikipedia, Lemmatisation, retrieved from https://en.wikipedia.org/w/index.php?title=Lemmatisation&oldid=948344582, last edited Mar. 31, 2020.

Wikipedia, Logit, retrieved from https://en.wikipedia.org/w/index.php?title=Logit&oldid=966729139, last edited Jul. 8, 2020.

Wikipedia, Probit, Retrieved from https://en.wikipedia.org/w/index.php?title=Probit&oldid=956140558, last edited on May 11, 2020.

Wikipedia, Sigmoid function, Retrieved from https://en.wikipedia.org/w/index.php?title=Sigmoid_function&oldid=963563127, last edited on Jun. 20, 2020.

Nickisch et al., "Approximations for Binary Gaussian Process Classification," Journal of Machine Learning Research 9 (2008) 2035-2078.

Hensman et al., "Scalable Variational Gaussian Process Classification," Proceedings of the 18th International Conference on Artificial Intelligence and Statistics, 2015, vol. 38, pp. 351-360.

Rasmussen, C. E. and Nickisch, H. (2010). Gaussian processes for machine learning (GPML) Toolbox. J. Mach. Learn. Res., 11, 3011-3015.

Rue et al., Approximate Bayesian inference for latent Gaussian models by using integrated nested Laplace approximations. Journal of the Royal Statistical Society: Series B (Statistical Methodology), 71(2), 319-392.

SAS Institute Inc. 2021. SAS® Visual Data Mining and Machine Learning: Procedures. Cary, NC: SAS Institute Inc., pp. 1-48 and 165-210.

Wes Kendall, MPI Broadcast and Collective Communication; MPI Tutorial, Retrieved from https://mpitutorial.com/tutorials/mpi-broadcast-and-collective-communication/, Printed Mar. 19, 2024.

Wes Kendall, MPI Reduce and Allreduce • MPI Tutorial; Retrieved from https://mpitutorial.com/tutorials/mpi-reduce-and-allreduce/, Printed Mar. 19, 2024.

Wikipedia; Polynomial Kernel; Retrieved from https://en.wikipedia.org/w/index.php?title=Polynomial_kernel&oldid=1190027395, last edited on Dec. 15, 2023.

* cited by examiner

DISTRIBUTED GAUSSIAN PROCESS CLASSIFICATION COMPUTING SYSTEM

CROSS-REFERENCE TO RELATED APPLICATIONS

The present application claims the benefit of and priority under 35 U.S.C. § 119 (e) to U.S. Provisional Patent Application No. 63/618,574 filed Jan. 8, 2024 and to U.S. Provisional Patent Application No. 63/621,524 filed Jan. 16, 2024, the entire contents of which are hereby incorporated by reference.

BACKGROUND

Gaussian process classification has been applied to classification tasks and includes parameters that are adaptive to the data to which the classification is applied and for which a Gaussian process model is defined. A classic inference method for Gaussian process classification, called the Laplacian approximation has been shown to yield very good classification results. However, Gaussian process classification with Laplacian approximation is unworkable with relatively large datasets, e.g., datasets with more than a million of observations, due to the prohibitive amount of computing time incurred.

SUMMARY

In an example embodiment, a computer-readable medium is provided having stored thereon computer-readable instructions that when executed by each computing device of a plurality of worker computing devices cause each computing device to train a classification model using distributed data. A first worker index and a second worker index are received from a controller device. The first worker index and the second worker index together uniquely identify a segment of a lower triangular matrix. The first worker index has a value from one to a predefined block size value, and the second worker index has a value from one to the predefined block size value. In response to receipt of a first computation request from the controller device, a training data subset distributed to the computing device is accessed wherein the training data subset is a subset of a training dataset. When the second worker index equals one, the accessed training data subset is sent to at least one worker computing device having a higher value for the first worker index. The training data subset sent from a lower index worker computing device, if any, is received. When the first worker index equals the second worker index, a first kernel matrix block is computed for the accessed training data subset using a predefined kernel function, wherein the first kernel matrix block is computed between observation vectors included in the accessed training data subset. When the first worker index does not equal the second worker index, the first kernel matrix block is computed for the received training data subset using the predefined kernel function, wherein the first kernel matrix block is computed between observation vectors included in the accessed training data subset and the received training data subset, wherein the first kernel matrix block defines an $h,k^{th}$ block of a kernel matrix, wherein h indicates the first worker index, and k indicates the second worker index. (A) In response to receipt of a second computation request from the controller device, a first vector is computed using the defined $h,k^{th}$ block of the kernel matrix,
a latent function vector is computed using the defined $h,k^{th}$ block of the kernel matrix and the computed first vector,
an objective function value is computed using the computed first vector, the computed latent function vector, and a likelihood function value computed for each observation vector included in the accessed training data subset, and
the computed objective function value is sent to the controller device. (A) is repeated until the controller device determines training of a classification model is complete. Model parameters for the trained classification model are output. The model parameters are computed from the likelihood function value computed for each observation vector included in the accessed training data subset.

In another example embodiment, a system is provided. The system includes, but is not limited to, a plurality of worker computing devices. Each computing device of the plurality of worker computing devices includes, but is not limited to, a processor and a non-transitory computer-readable medium having stored thereon computer-readable instructions that when executed by each computing device cause each computing device to train a classification model using distributed data.

In yet another example embodiment, a method of training a classification model using distributed training data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
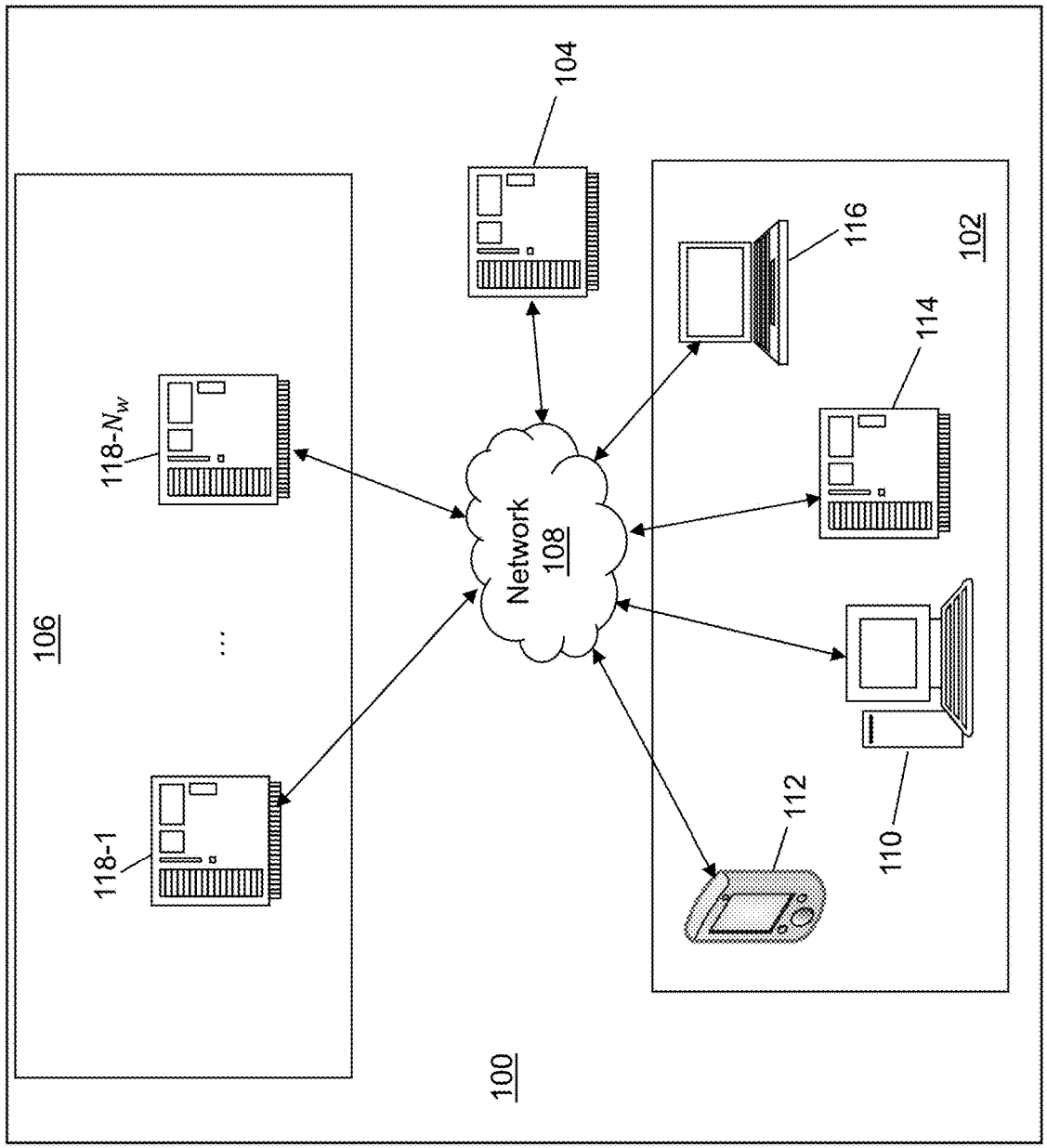
FIG. 1 depicts a block diagram of a classification model training system in accordance with an illustrative embodiment.

Classification is a recognition, differentiation, and organization of observed observation data into categories or classes to which labels may be assigned that identify a characteristic of each observation. The most common classification is a binary classification, where the data are labeled between two classes such as '0' or '1'. Classification is a supervised learning task that uses training data that has been labeled to train a classification model that can be applied to classify unclassified or unlabeled data.

Gaussian process classification (GPC) implements Gaussian processes (GP) for classification purposes, more specifically for probabilistic classification in a nonparametric way, where test predictions take the form of class probabilities. GPC places a GP prior on a latent function, which is passed through a sigmoid function to obtain the probabilistic classification. The latent function may be a so-called nuisance function whose values are not observed and are not relevant by themselves. The purpose of the latent function is to provide a convenient formulation of the classification model, and the latent function is integrated out during the process of predicting a class.

In contrast to a regression setting, the posterior of the latent function vector in GPC is not Gaussian even for a GP prior since a Gaussian likelihood is inappropriate for discrete class labels. Rather, a non-Gaussian likelihood corresponding to the logistic link function (logit) may be used as well as other optional functions.

There are two major methods for model inference for GPC, the Laplacian approximation (LA) and stochastic variational inference (SVI). The LA method uses a Gaussian to approximate the usually not Gaussian model posterior. LA can also be regarded as a variational inference method that has the advantage of accurate classification results with the disadvantage of being computationally slow and, as a result, inapplicable to large datasets. SVI uses a stochastic search in the model inference process and a variational posterior on a number of randomly selected minibatches of training data. SVI is computationally fast, but less accurate including sometimes yielding poor classification results.

A classification model training application 222 described herein provides a distributed LA inference method for GPC so that the more accurate LA inference method for GPC can be applied to large datasets distributed across a plurality of computing devices. Unlike U.S. Pat. No. 11,227,223, which issued Jan. 18, 2022 and is assigned to the assignee of the present application, classification model training application 222 provides a distributed LA inference model for GPC with a data balanced Cholesky decomposition, meaning each computer of the plurality of computing devices stores the same number of observation vectors and, as a result, performs a common amount of computing work. As a result, a hardware requirement for a single machine is reduced and a capacity and a speed of the algorithm are significantly improved. Classification model training application 222 further provides no loss in classification accuracy with the significantly faster computation time as discussed further below.

Referring to FIG. 1, a block diagram of a classification model training system 100 is shown in accordance with an illustrative embodiment. In an illustrative embodiment, classification model training system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
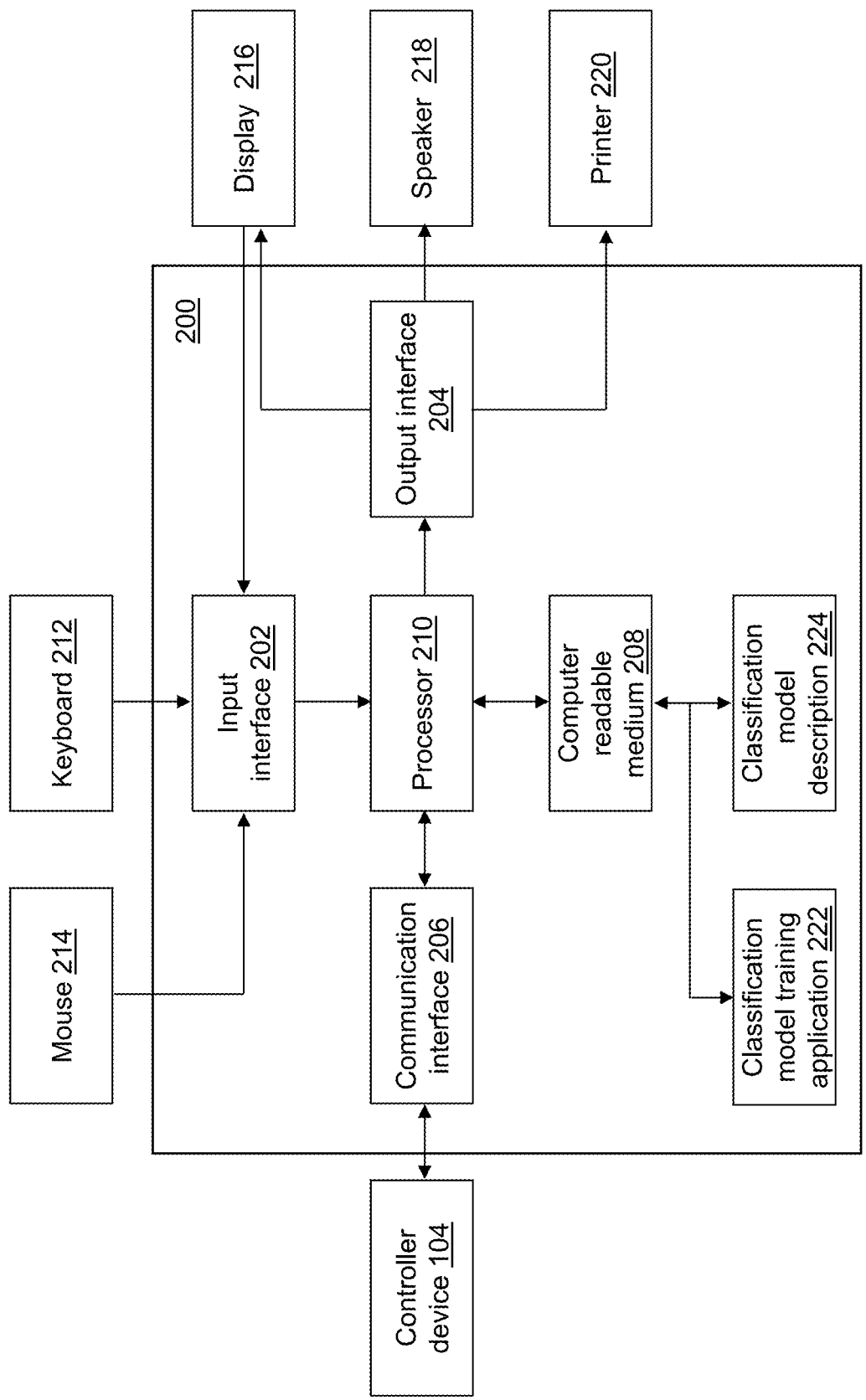
FIG. 2 depicts a block diagram of a user device of the classification model training system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, classification model training application 222, and a classification model description 224. Each computing device of user system 102 may be executing classification model training application 222 of the same or different type. User device 200 may execute classification model training application 222 that triggers creation of classification model description 224.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Classification model training system 100 further may include a plurality of controller devices.

Figure 3:
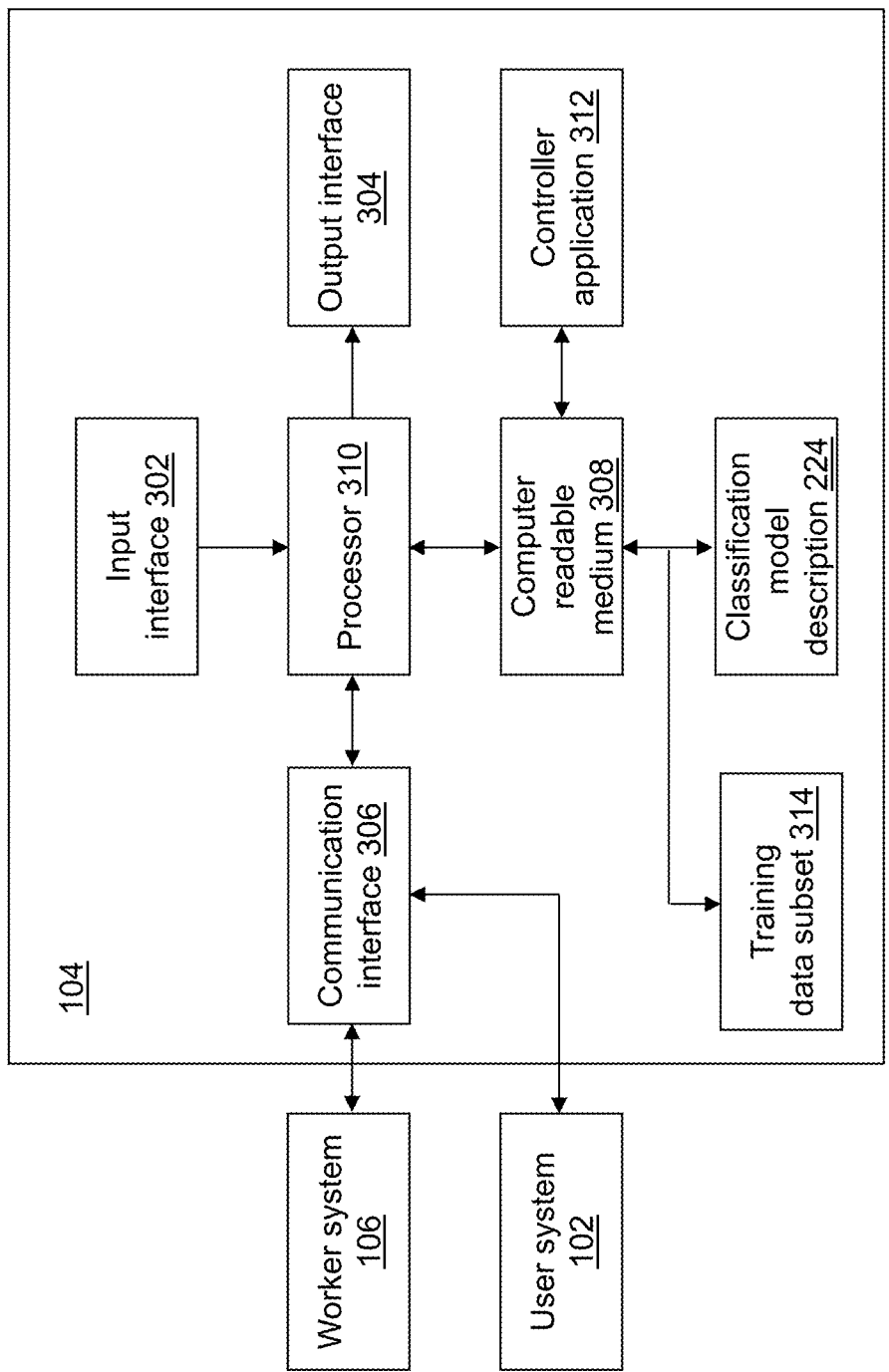
FIG. 3 depicts a block diagram of a controller device of the classification model training system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second non-transitory computer-readable medium 308, a second processor 310, a controller application 312, training data subset 314, and classification model description 224. Controller device 104 may execute controller application 312 that creates classification model description 224 that may be shared with or accessible by user device 200.

Referring again to FIG. 1, the one or more computing devices of worker system 106 may include computers of any form factor such as a desktop, a server, a laptop, etc. For example, in the illustrative embodiment, worker system 106 includes a first worker computer 118-1, . . . , and an $N_w^{th}$ worker computer 118-$N_w$, where $N_w$ indicates a number of worker computing devices of worker system 106. Each worker computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
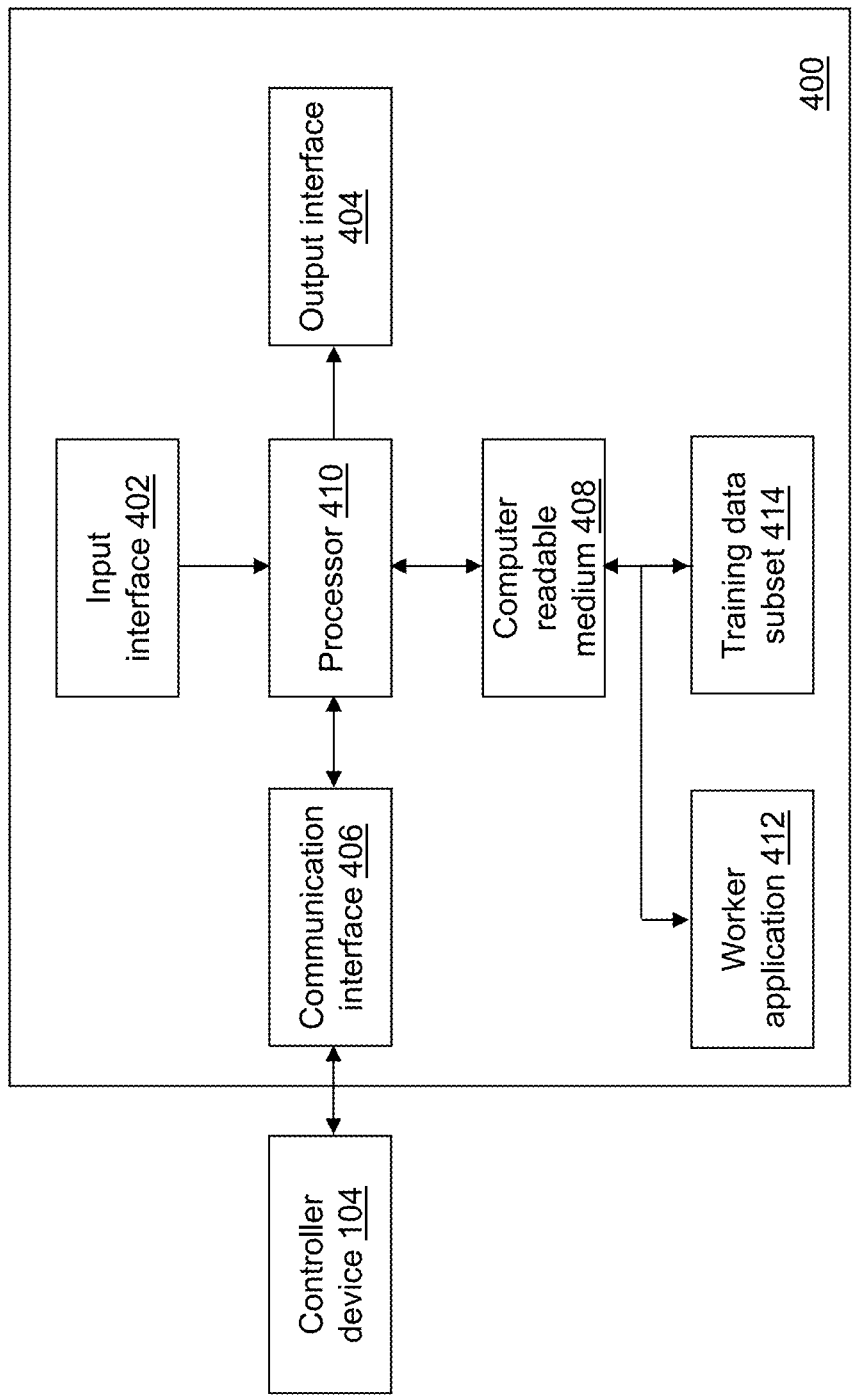
FIG. 4 depicts a block diagram of a worker device of the classification model training system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first worker computer 118-1, . . . , and $N_w^{th}$ worker computer 118-$N_w$ may be an instance of worker device 400. Worker device 400 may include a third input interface 402, a third output interface 404, a third communication interface 406, a third non-transitory computer-readable medium 408, a third processor 410, a worker application 412, and a training data subset 414. A training dataset is distributed into training data subset 414 at each worker device 400 of worker system 106. The entirety of the training dataset is distributed. In an alternative embodiment, controller device 104 may also be used to perform the operations described for each worker device 400 with a portion of the training dataset distributed to controller device 104 and stored in training data subset 314. To make a number of observation vectors distributed onto each worker device 400 equal, one or more rows of observation vectors having zero values for all of the variables may be appended to training data subset 414 on a single worker device 400 of worker system 106 or to training data subset 314 of controller device 104.

Referring again to FIG. 2, each user device 200 of user system 102 may include the same or different components and combinations of components. Fewer, different, and additional components may be incorporated into user device 200.

Input interface 202 provides an interface for receiving information from the user or another device for entry into user device 200 as understood by those skilled in the art. Input interface 202 may interface with various input technologies including, but not limited to, a keyboard 212, a microphone, a mouse 214, a display 216, a track ball, a keypad, one or more buttons, etc. to allow the user to enter information into user device 200 or to make selections presented in a user interface displayed on display 216.

The same interface may support both input interface 202 and output interface 204. For example, display 216 comprising a touch screen provides a mechanism for user input and for presentation of output to the user. User device 200 may have one or more input interfaces that use the same or a different input interface technology. The input interface technology further may be accessible by user device 200 through communication interface 206.

Output interface 204 provides an interface for outputting information for review by a user of user device 200 and/or for use by another application or device. For example, output interface 204 may interface with various output technologies including, but not limited to, display 216, a speaker 218, a printer 220, etc. User device 200 may have one or more output interfaces that use the same or a different output interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth® antenna, a telephone jack, a USB port, etc. Data and/or messages may be transferred between user device 200 and controller device 104 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD, DVD, an external hard drive, etc. One or more external hard drives further may be connected to user device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification model training application 222 performs operations associated with triggering training of a classification model using data stored in the training dataset. Information that describes the trained classification model is stored in classification model description 224. Data describing the trained classification model may be read from classification model description 224 and used to predict classifications for data stored in input data that may be distributed across a second worker system 806 (shown referring to FIG. 8). Some or all of the operations described herein may be embodied in classification model training application 222. The operations may be implemented using hardware, firmware, software, or any combination of these methods.

Referring to the example embodiment of FIG. 2, classification model training application 222 is implemented in software (comprised of computer-readable and/or computer-executable instructions) stored in computer-readable medium 208 and accessible by processor 210 for execution of the instructions that embody the operations of classification model training application 222. Classification model training application 222 may be written using one or more programming languages, assembly languages, scripting languages, etc. Classification model training application 222 may be integrated with other analytic tools. As an example, classification model training application 222 may be part of an integrated data analytics software application and/or software architecture such as that offered by SAS Institute Inc. of Cary, North Carolina, USA. Merely for illustration, classification model training application 222 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Classification model training application 222 may be implemented as a Web application. For example, classification model training application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Controller application 312 performs operations associated with training a classification model based on inputs provided from user device 200 and using the computing devices of worker system 106. The operations may be implemented using hardware, firmware, software, or any combination of these methods. Referring to the example embodiment of FIG. 3, controller application 312 is implemented in software (comprised of computer-readable and/or computer-executable instructions) stored in second computer-readable medium 308 and accessible by second processor 310 for execution of the instructions that embody the operations of controller application 312. Controller application 312 may be written using one or more programming languages, assembly languages, scripting languages, etc. Controller application 312 may be implemented as a Web application.

Controller application 312 may be integrated with other analytic tools. As an example, controller application 312 may be part of an integrated data analytics software application and/or software architecture such as that offered by SAS Institute Inc. of Cary, North Carolina, USA. For example, controller application 312 may be part of SAS® CAS developed and provided by SAS Institute Inc. of Cary, North Carolina, USA. Merely for further illustration, controller application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, and SAS In-Memory Statistics for Hadoop®.

Referring to FIG. 4, fewer, different, and additional components may be incorporated into worker device 400. Each worker device 400 of worker system 106 may include the same or different components or combination of components. Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between controller device 104 and worker device 400 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Worker application 412 may be integrated with other analytic tools. As an example, worker application 412 may be part of an integrated data analytics software application and/or software architecture such as that offered by SAS Institute Inc. of Cary, North Carolina, USA. For example, worker application 412 may be part of SAS® CAS. Merely for further illustration, worker application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, and SAS In-Memory Statistics for Hadoop®.

Classification model training application 222, controller application 312, and worker application 412 may be the same or different applications that are integrated in various manners to train a classification model using each training data subset 414 and, optionally, training data subset 314.

The training dataset may include, for example, a plurality of rows and a plurality of columns. The plurality of rows may be referred to as observation vectors or records (observations), and the columns may be referred to as variables. In an alternative embodiment, the training dataset may be transposed. The plurality of variables defines a vector $x_i$ for each observation vector i=1, 2, ..., N, where N is a number of the observation vectors included in the training dataset. The training dataset includes a target variable value y; for each observation vector that indicates a label, or class, or other characteristic defined for the respective observation vector $x_i$. The training dataset may include additional variables that are not included in the plurality of variables.

The training dataset includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

In data science, engineering, and statistical applications, data often consists of multiple measurements (across sensors, characteristics, responses, etc.) collected across multiple time instances (patients, test subjects, etc.). These measurements may be collected in the training dataset for analysis and processing. The training dataset may include data captured as a function of time for one or more physical objects. The data stored in the training dataset may be captured at different time points periodically, intermittently, when an event occurs, etc. The training dataset may include data captured at a high data rate such as 200 or more observation vectors per second for one or more physical objects. One or more columns of the training dataset may include a time and/or date value. The training dataset may include data captured under normal and abnormal operating conditions of the physical object.

One or more variables of the plurality of variables may describe a characteristic of a physical object. For example, if the training dataset includes data related to operation of a vehicle, the variables may include a type of vehicle, an oil pressure, a speed, a gear indicator, a gas tank level, a tire pressure for each tire, an engine temperature, a radiator level, etc. some or all of which may be measured by a sensor.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, the training dataset may include image data captured by medical imaging equipment (i.e., computed tomography image, magnetic resonance image, x-ray image, ultrasound image, etc.) of a body part of a living thing. A subset of the image data is labeled and captured in the training dataset, for example, as either indicating existence of a medical condition or non-existence of the medical condition. The training dataset may include a reference to image data that may be stored, for example, in an image file or in a video file, and the existence/non-existence label associated with each image file or video file. The training dataset may include a plurality of such references. The existence/non-existence label or other label may be defined by a clinician or expert in the field to which data stored in the training dataset relates.

The data stored in the training dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in the training dataset may be generated as part of the Internet of Things (IoT), where things (e.g., machines, devices, phones, sensors) can be connected to networks and the data from these things collected and processed within the things and/or external to the things before being stored in the training dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in the training dataset.

The data stored in the training dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The training dataset may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

The training dataset may be stored using various data structures as known to those skilled in the art including one or more files of a file system, a relational database, one or more tables of a system of tables, a structured query language database, etc. on controller device 104 and/or on worker system 106. Controller device 104 may coordinate access to the training dataset that is distributed across worker system 106 such that each worker device 400 stores a subset of the training dataset. For example, the training dataset may be stored in a cube distributed across a grid of computers as understood by a person of skill in the art. As another example, the training dataset may be stored in a multi-node Hadoop® class. For instance, Apache™ Hadoop® is an open-source software framework for distributed computing supported by the Apache Software Foundation. As another example, the training dataset may be stored in a cloud of computers and accessed using cloud computing technologies, as understood by a person of skill in the art. The SAS® LASR™ Analytic Server may be used as an analytic platform to enable multiple users to concurrently access data stored in the training dataset. The SAS Viya open, cloud-ready, in-memory architecture also may be used as an analytic platform to enable multiple users to concurrently access data stored in the training dataset. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
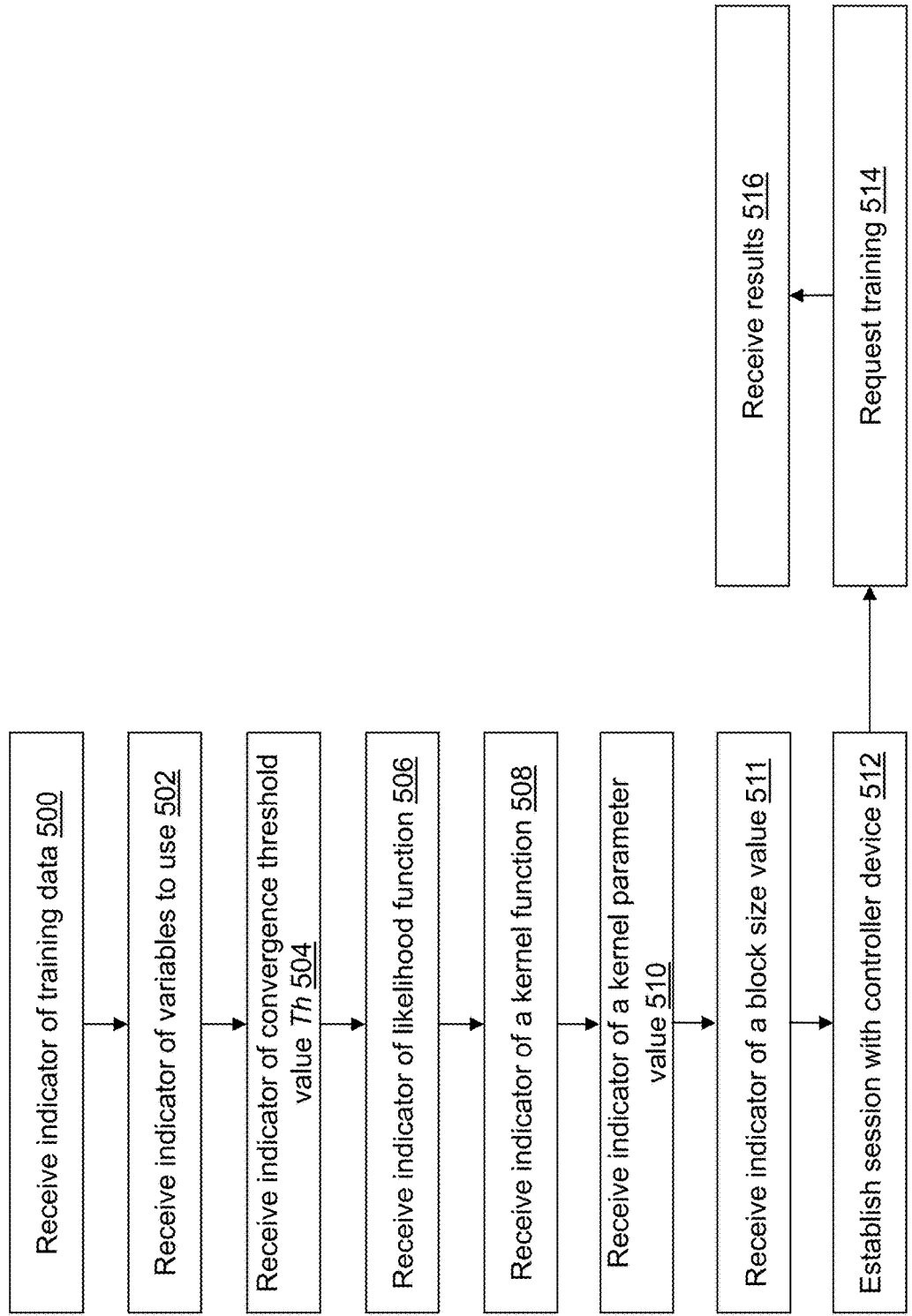
FIG. 5 depicts a flow diagram illustrating examples of operations performed by the user device of FIG. 2 in accordance with an illustrative embodiment.

Referring to FIG. 5, example operations associated with classification model training application 222 are described. Additional, fewer, or different operations may be performed depending on the embodiment of classification model training application 222. The order of presentation of the operations of FIG. 5 is not intended to be limiting. Some of the operations may not be performed in some embodiments. Although some of the operational flows are presented in sequence, the various operations may be performed in various repetitions and/or in other orders than those that are illustrated. For example, a user may execute classification model training application 222, which causes presentation of a first user interface window, which may include a plurality of menus and selectors such as drop-down menus, buttons, text boxes, hyperlinks, etc. associated with classification model training application 222 as understood by a person of skill in the art. The plurality of menus and selectors may be accessed in various orders. An indicator may indicate one or more items from a user interface, one or more data entries into a data field of the user interface, one or more data items read from computer-readable medium 208 or otherwise defined with one or more default values, etc. that are received as an input by classification model training application 222 or provided with classification model training application 222.

In an operation 500, a first indicator may be received that indicates the training dataset. For example, the first indicator indicates a location and a name of the training dataset. As an example, the first indicator may be received by classification model training application 222 after selection from a user interface window or after entry by a user into a user interface window. In an alternative embodiment, the training dataset may not be selectable. For example, a most recently created dataset may be used automatically.

In an operation 502, a second indicator may be received that indicates the plurality of variables to use in the training dataset. For example, the second indicator may indicate one or more column numbers or one or more column names. As another option, all of the columns of the training dataset except either a first or a last column may be assumed to be the plurality of variables. The plurality of variables are the variables that define each observation vector $x_i$. The first column, the last column, or another column may further be indicated as the target variable value $y_i$ associated with a respective $i^{th}$ observation vector.

In an operation 504, a third indicator of a convergence threshold value Th may be received. As an example, the third indicator may be received by classification model training application 222 after selection from a user interface window or after entry by a user into a user interface window. In an alternative embodiment, the third indicator may not be received. For example, a default value may be stored, for example, in computer-readable medium 208 and used automatically. In another alternative embodiment, the value of the convergence threshold value Th may not be selectable. Instead, a fixed, predefined value may be used. For illustration, a default value of the convergence threshold value Th may be 0.000001 though other values may be used.

In an operation 506, a fourth indicator of a likelihood function $l(y|f(x))$ of y given $f(x)$, where $f(x)$ is a latent function value of x, may be received. For example, the fourth indicator indicates a name of a likelihood function. For illustration, the likelihood function $l(y|f(x))$ may be a sigmoid function. The fourth indicator may be received by classification model training application 222 after selection from a user interface window or after entry by a user into a user interface window. A default value for the likelihood function may further be stored, for example, in computer-readable medium 208. As an example, a likelihood function may be selected from "Logit", "Probit", etc. For example, a default likelihood function may be the Logit function. Of course, the likelihood function may be labeled or selected in a variety of different manners by the user as understood by a person of skill in the art. In an alternative embodiment, the likelihood function may not be selectable, and a single likelihood function is implemented in classification model training application 222. For example, the Logit function may be used by default or without allowing a selection. The Logit function may be defined as $$l(y|f(x)) = \frac{1}{1 + e^{-yf(x)}}.$$

The Probit function computes a $\tau^{th}$ quantile from a standard normal distribution $N(\tau|0,1)$ and may be defined as $$l(y|f(x)) = \int_{-\infty}^{x} \mathcal{N}(\tau|0, 1) d\tau,$$

where the predefined likelihood function computes a probability that the observation vector x is less than or equal to a $\tau^{th}$ quantile of the standard normal distribution.

In an operation 508, a fifth indicator of a kernel function $K_f$ may be received. For example, the fifth indicator indicates a name of a kernel function. For illustration, kernel function $K_f$ may be a polynomial kernel function. The fifth indicator may be received by classification model training application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Matern", "Periodic", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification model training application 222. For example, the Gaussian kernel function may be used by default or without allowing a selection. The Gaussian kernel function may be defined as $$K_f(x_i, x_j) = \exp\left(\frac{-\|x_i - x_j\|^2}{2s^2}\right),$$

where s is a kernel parameter that is termed a Gaussian bandwidth parameter.

In an operation 510, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in computer-readable medium 208 and used automatically or the kernel parameter value may not be used. In another alternative embodiment, the value of the kernel parameter may not be selectable. Instead, a fixed, predefined value may be used.

In an operation 511, a seventh indicator of a block size value H may be received. The block size value H is also a number of rows of a blocked kernel matrix computed using the kernel function $K_f$. As an example, the seventh indicator may be received by classification model training application 222 after selection from a user interface window or after entry by a user into a user interface window. In an alternative embodiment, the seventh indicator may not be received. For example, a default value may be stored, for example, in computer-readable medium 208 and used automatically. In another alternative embodiment, the value of the block size value H may not be selectable. Instead, a fixed, predefined value may be used. For illustration, a default value of the block size value H may be 5 though other values may be used.

The number of worker computing devices is defined by the block size value H as $$N_w = \frac{H(H+1)}{2}, N_{od} = \frac{N}{H}$$

worker device 400 of worker system 106 and optionally controller device 104. When distribution of the initial number of observation vectors is not equal, a number of rows of zero observation vectors is added to make the distribution equal. A zero observation vector includes a value of zero for each variable of the plurality of variables indicated in operation 502. Though any zero observation vector is not observed, it is treated in an identical manner to other observation vectors.

In an operation 512, a session is established with controller device 104 when user device 200 and controller device 104 are not integrated. User device 200 accepts commands from a user and relays instructions to controller device 104 when user device 200 and controller device 104 are not integrated. Controller device 104 establishes a communication network with the worker devices of worker system 106, sending instructions to each worker device 400 of worker system 106, collecting and aggregating the results of computations from each worker device 400 of worker system 106, and communicating final results to user device 200.

In an operation 514, training of the classification model is requested. When controller device 104 and user device 200 are integrated in the same computing device, training is initiated as described further referring to FIG. 6. The request may include zero or more of the values defined for the parameters indicated in operations 500 to 511 or zero or more of the values may be stored in a memory location known to controller device 104 when controller device 104 and user device 200 are not integrated in the same computing device.

In an operation 516, results may be received from controller device 104 when controller device 104 and user device 200 are not integrated in the same computing device. As another example, an indicator may be received that indicates that the training process is complete. For example, one or more output tables may be presented on display 216 when the training process is complete. As another option, display 216 may present a statement indicating that the training process is complete. The user can access the output tables in a predefined location. Illustrative results may include a posterior latent function, also referred to as global latent function fg, that is defined by local latent functions defined by each worker device 400 of worker system 106.

Figure 6:
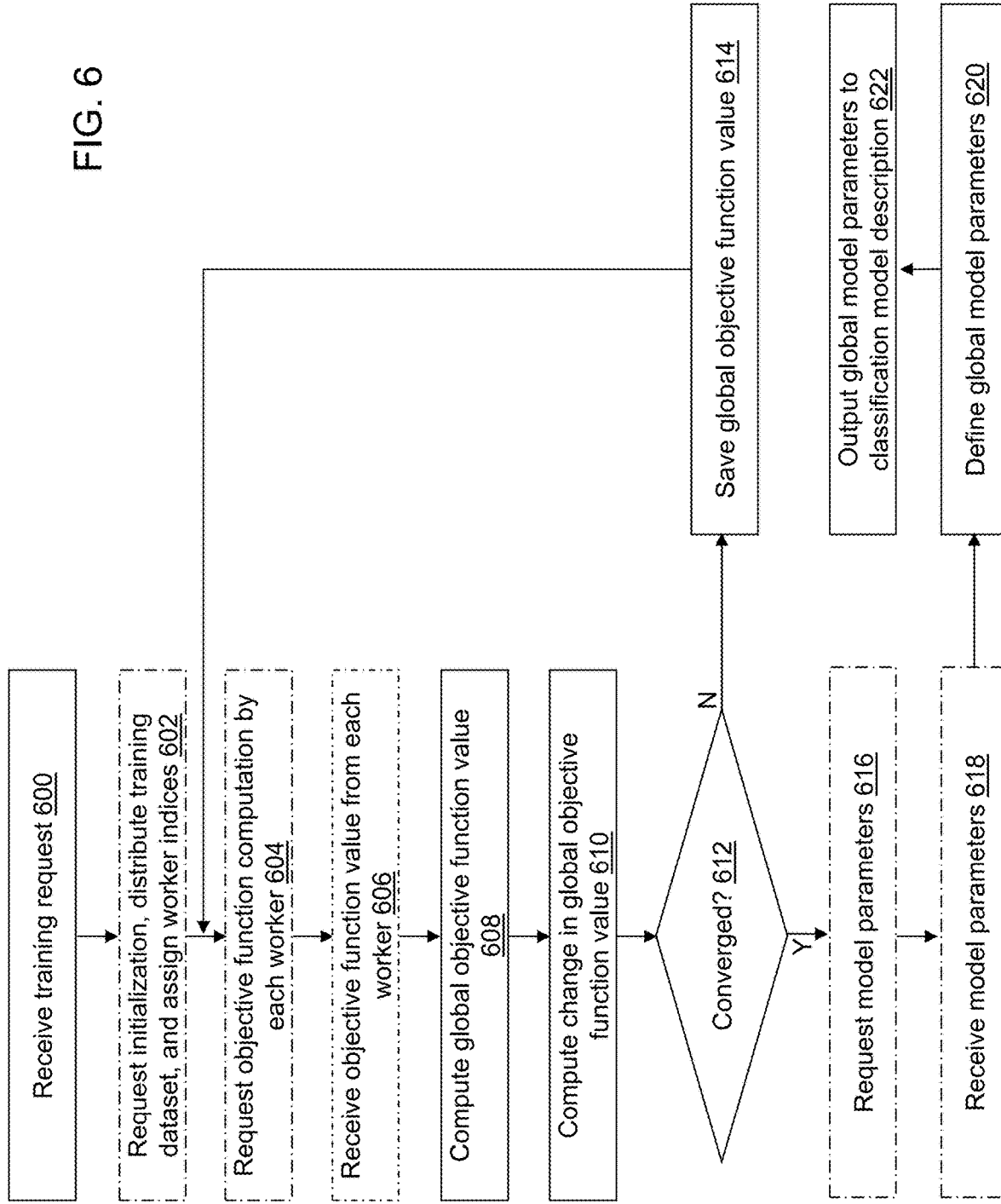
FIG. 6 depicts a flow diagram illustrating examples of operations performed by the controller device of FIG. 3 in accordance with an illustrative embodiment.

Referring to FIG. 6, example operations associated with controller application 312 are described. Additional, fewer, or different operations may be performed depending on the embodiment. The order of presentation of the operations of FIG. 6 is not intended to be limiting. Again, controller application 312 and classification model training application 222 may be integrated or be the same applications so that the operations of FIGS. 5 and 6 are merged.

In an operation 600, the training request may be received from user device 200 or directly from the user of user device 200 when controller device 104 and user device 200 are integrated in the same computing device. Values for the parameters indicated in operations 500 to 511 may be received from user device 200 or directly from the user of user device 200 when integrated or read from a known storage location. A previous objective function value Cy may be initialized to zero.

In an operation 602, a request that each worker device 400 of worker system 106 perform initialization is sent. The request may be sent by a controller thread of controller device 104. The training dataset is further distributed across each worker device 400 of worker system 106 such that each worker device 400 has the same number of observation vectors.

A unique pair of worker indices is assigned to each worker device 400 of worker system 106. For illustration, a first worker index may indicate a row and be indicated as h, and a second worker index may indicate a column and be indicated as k. For example, a worker index h=1, k=1 may be assigned to first worker computer 118-1; a worker index h=2, k=1 may be assigned to a second worker computer and a worker index h=2, k=2 may be assigned to a third worker computer; etc., where a number of worker computers for each block is equal to the value of h to form a lower triangular matrix of computers. For example, when H=4, $$N_w = \frac{4(4+1)}{2} = 10,$$

and the following indices are assigned to the ten worker computers: a worker index h=1, k=1 may be assigned to first worker computer 118-1; a worker index h=2, k=1 may be assigned to the second worker computer and a worker index h=2, k=2 may be assigned to the third worker computer; a worker index h=3, k=1 may be assigned to a fourth worker computer, a worker index h=3, k=2 may be assigned to a fifth worker computer, and a worker index h=3, k=3 may be assigned to a sixth worker computer; and a worker index h=4, k=1 may be assigned to a seventh worker computer, a worker index h=4, k=2 may be assigned to an eighth worker computer, and a worker index h=4, k=3 may be assigned to a ninth worker computer, and a worker index h=4, k=4 may be assigned to a tenth worker computer, $N_w^{th}$ worker computer 118-$N_w$.

The request may include the unique pair of worker indices assigned to each worker device 400. Initialization processing by each worker device 400 is described in FIG. 7A. Each block of data included in training data subset 414 or, optionally, training data subset 314 is distributed to a row of machines defined by a common value of h such that each machine in the $h^{th}$ block keeps a common data segment defined as $$[x_{(h-1)N_{od}+1}, x_{(h-1)N_{od}+2}, \ldots, x_{(h-1)N_{od}+N_{od}}].$$

Typically, the number of rows of zero observation vectors is added to training data subset 414 stored on each worker computer having h=4.

In an operation 604, a request is sent to each worker device 400 of worker system 106 to compute an objective function value $C_{h,k}$ using training data subset 414 distributed to each worker device 400, where the subscript h, k indicates the pair of indices assigned to a respective worker device 400 that may include controller device 104. The request may be sent by a controller thread of controller device 104. Processing by each worker device 400 to compute the objective function value $C_{h,k}$ is described in FIG. 7B.

In an operation 606, the objective function value $C_{h,k}$ is received from each worker device 400 of worker system 106 that may include controller device 104. The values may be received by the controller thread of controller device 104. In an alternative embodiment, the objective function value may be sent from any single worker device 400 associated with each value of h=1, . . . , H. For example, only the single worker device 400 having k=1 may send the objective function value to controller device 104.

In an operation 608, a global objective function value $C_g$ is computed by summing the objective function value $C_{h,k}$ received from each worker device 400. For example, $$C_g = \sum_{h=1}^{H} C_{h,1}.$$

In an alternative embodiment, the objective function value may be included from any single worker device 400 associated with each value of h=1, . . . , H not necessarily the single worker device 400 having k=1.

In an operation 610, a change in the objective function value ΔC is computed, for example, using $$\Delta C = |C_g - C_p|.$$

In an operation 612, a determination is made concerning whether ΔC<Th such that the computations have converged. If ΔC<Th, processing continues in an operation 616 to indicate convergence has been achieved. If ΔC≥Th, processing continues in an operation 614. In addition, or in the alternative, a number of iterations of operation 604 may be used to determine that processing is complete.

In operation 614, $C_p$ is updated for a next iteration using $C_p = C_g$, and processing continues in operation 604.

In operation 616, a request is sent to each worker device 400 of worker system 106 to provide model parameters, $W_{h,k}$, $D_{h,k}$, and $L_{h,k}$.

In an operation 618, the model parameters $W_h$, $D_h$, and $L_{h,k}$ are received from each worker device 400 of worker system 106, where $D_h$ and $W_n$ are vectors of length $N_{od}$, and $L_{h,k}$ is an $N_{od} \times N_{od}$ matrix.

In an operation 620, the global model parameters $W_g$, $D_g$, and $L_g$ are defined. For example, $W_g$ is defined by concatenating the vector $W_n$ received from a first worker computing device indicated for each row in the order defined by the training dataset so that each entry of the vector $W_g$ corresponds to an observation vector read from the training dataset in the order stored in the training dataset. For example, $W_g$=concatenation $(W_{h,1})$, h=1, ..., H. Similarly, $D_g$ is defined by concatenating the vector $D_h$, for example using, $D_g$=concatenation $(D_{h,1})$, h=1, ..., H. $L_g$ is defined by stacking the matrices $L_h$, k in the order defined by the training dataset, $L_g$=stack $(L_{h,k})$,h=1, ..., H, k=1, ..., h. An upper triangular matrix portion of $L_g$ may be defined with all zeroes.

In an operation 622, the global model parameters $W_g$, $D_g$, and $L_g$ are output, for example, to classification model description 224, and an indicator sent to user device 200 indicating that model training is complete. The kernel function indicator and the kernel parameter indicator may further be output to classification model description 224. The variables to use identified in operation 502 may also be output to classification model description 224 for each observation vector included in the training dataset.

Figure 7A:
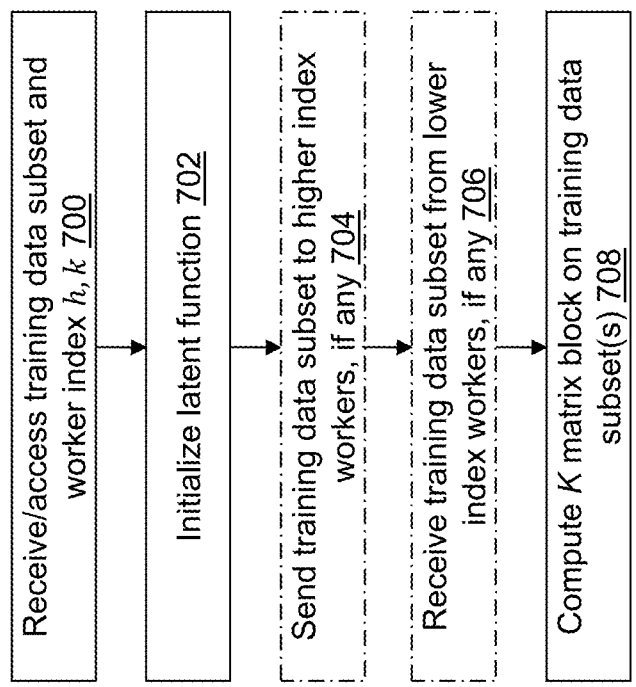
FIGS. 7A to 7C depict flow diagrams illustrating examples of operations performed by the worker device of FIG. 4 in accordance with an illustrative embodiment.
Figure 7B:
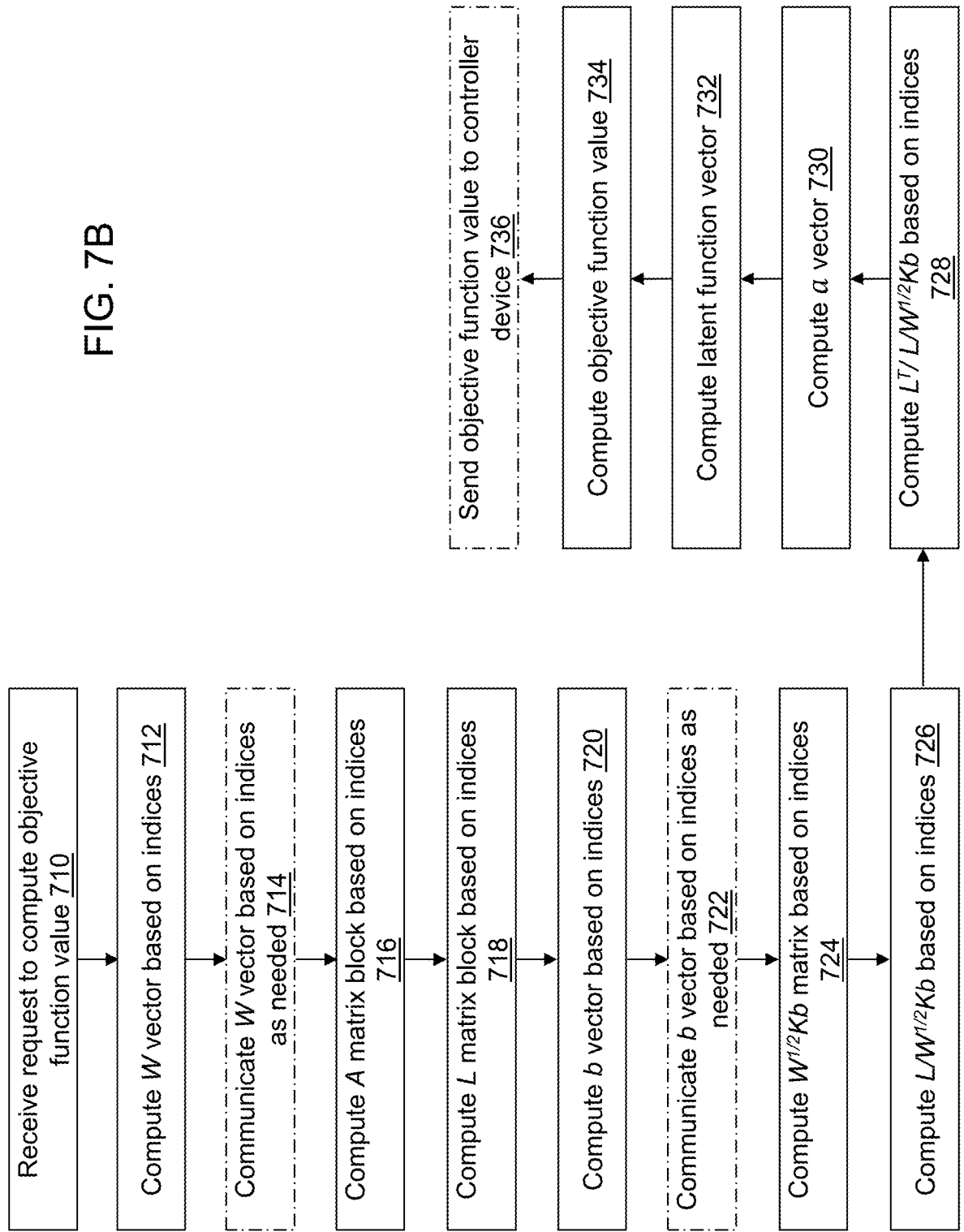
Figure 7C:
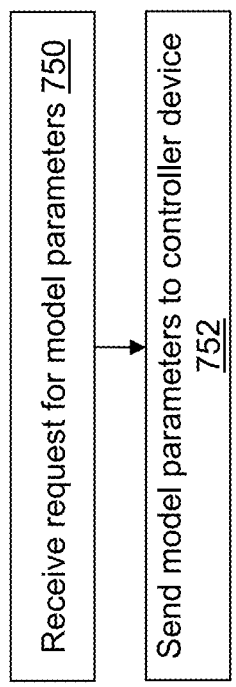

Referring to FIGS. 7A to 7C, example operations associated with worker application 412 are described. Additional, fewer, or different operations may be performed depending on the embodiment. The order of presentation of the operations of FIGS. 7A to 7C is not intended to be limiting. When controller device 104 is acting as a worker device, controller device 104 also executes the operations of FIGS. 7A to 7C with an assigned training data subset 414.

Referring to FIG. 7A, in an operation 700, the request to initialize is received from controller device 104 as a result of operation 602. The request may include the pair of assigned worker indices h, k and the parameters received in operations 500 to 511 or the parameter values may be otherwise provided to each worker in a known memory location or based on a default value. Training data subset 414 may already be stored on each worker device 400, may be received from another device such as controller device 104, may be accessed in a known location, etc. such that each worker device has training data subset 414 that includes $N_{od}$ observation vectors.

In an operation 702, the latent function vector f is initialized, for example, using $f_i$=0, i=1, ..., $N_{od}$ for each of the $N_{od}$ entries.

In an operation 704, training data subset 414 is downstream broadcast to downstream worker devices, if any, of worker system 106 that may include controller device 104. For example, when a data item is downstream broadcast, worker device 400 assigned worker indices h=1, k=1, sends the data item to each other worker computer having first worker index h=2, ..., H; worker device 400 assigned worker index h=2, k=1, sends the data item to each other worker having first worker index h=3, ..., H; worker device 400 assigned worker index h=3, k=1, sends the data item to each other worker having first worker index h=4, ..., H; and so on such that worker device 400 assigned first worker index h=H does not send the data item to any other worker device of worker system 106. Instead, worker device 400 assigned first worker index h=H receives the data item from each other worker device of worker system 106. Conversely, worker device 400 assigned first worker index h=1 sends the data item to each other worker device of worker system 106, but does not receive the data item from any other worker device of worker system 106. Each worker device 400 assigned indices h=2, ..., H−1, k=1 sends the data item to each other worker device of worker system 106 having a higher value for h, and each worker device 400 assigned indices h=2, ..., H−1 receives the data item from each other worker device of worker system 106 having a lower value for h and k=1.

In an operation 706, training data subset 414 is received from upstream worker devices having lower first worker index values, if any, of worker system 106 that may include controller device 104. Based on the downstream broadcasting, each worker device 400 receives N, =h−1 blocks of observation vectors that each include $N_{od}$ observation vectors.

In an operation 708, an h,$k^{th}$ block of a kernel matrix K is computed using the observation vectors read from training data subset 414 or training data subset 314 and the N, blocks of observation vectors received from the upstream worker devices with the kernel function $K_f$ and kernel parameter value. Each block of kernel matrix $K_{h,k}(x_{i,h}, x_{j,k})$, k=1, ..., h, h=1, ..., H is an $N_{od} \times N_{od}$ matrix computed using the kernel function $K_f$ and kernel parameter value with the associated $x_i$, $x_j$. For example, worker device 400 assigned first worker index h=1 does not receive any blocks of observation vectors, so worker device 400 assigned first worker index h=1 only computes $K_{1,1}(x_{i,1}, x_{j,1})$, i=1, ..., $N_{od}$, j=1, ..., $N_{od}$. For example, when $$K_f(x_i, x_j) = \exp\left(\frac{-\|x_i - x_j\|^2}{2s^2}\right), K_{11}(x_{i,1}, x_{j,1}) = \exp\left(\frac{-\|x_{i,1} - x_{j,1}\|^2}{2s^2}\right),$$

$$i = 1, \ldots, N_{od}, j = 1, \ldots, N_{od}.$$

Worker device 400 assigned indices h=2, k=1 and worker device 400 assigned indices h=2, k=2 receive a single block of observation vectors from worker device 400 assigned first worker index h=1 referred to as $x_{i,1}$, i=1, ..., $N_{od}$, N,=1. Worker device 400 assigned indices h=2, k=1 computes $K_{2,1}(x_{1,2}, x_{j,1})$, i=1, ..., $N_{od}$, j=1, ..., $N_{od}$ from the block of observations $x_{i,1}$ received from worker device 400 assigned indices h=1, k=1. Worker device 400 assigned indices h=2, k=2 computes $K_{2,2}(x_{1,2}, x_{j,2})$, i=1, ..., $N_{od}$, j=1, ..., $N_{od}$ from the block of observations $x_{i,1}$ received from worker device 400 assigned indices h=1, k=1. The process repeats for each value of h=1, ..., H such that each worker computer computes and stores its h,$k^{th}$ block of the kernel matrix K.

For illustration, a function MPI_Bcast may be used to broadcast the data in a parallel computing architecture such as using the blocks distributed across the plurality of worker computing devices. The message passing interface (MPI) is used to communicate values as understood by a person of skill in the art. In alternative embodiments, other broadcasting methods may be used.

Worker device 400 assigned indices h=3, k=1, worker device 400 assigned indices h=3, k=2, and worker device 400 assigned indices h=3, k=3 receive a single block of observation vectors from worker device 400 assigned first worker index h=1 and a block of observation vectors from worker device 400 assigned indices h=2, k=1 referred to as $x_{i,2}$, i=1, ..., $N_{od}$, N=2. Worker device 400 assigned indices h=3, k=1 computes $K_{3,1}(x_{i,3}, x_{j,1})$, i=1, ..., $N_{od}$, j=1, ..., $N_{od}$ from the block of observations $x_{i,1}$ received from worker device 400 assigned indices h=1, k=1. Worker device 400 assigned indices h=3, k=2 computes $K_{3,2}(x_{i,3}, x_{j,2})$, i=1, ..., $N_{od}$, j=1, ..., $N_{od}$ from the block of observations received from worker device 400 assigned indices h=2, k=1. Worker device 400 assigned indices h=3, k=3 computes $K_{3,3}(x_{i,3}, x_{j,3})$, i=1, . . . , $N_{od}$, j=1, . . . , $N_{od}$. The kernel matrix K is a lower triangular matrix as are the block matrices on the diagonal such as $K_{1,1}$, $K_{2,2}$, $K_{3,3}$, etc.

Referring to FIG. 7B, in an operation 710, the request to compute the objective function value is received from controller device 104 as a result of operation 604.

Similar to operation 708, in an operation 712, a $W_{h,k}$ vector is computed using the observation vectors read from training data subset 414 or training data subset 314 based on the likelihood function. The $W_{h,k}$ vector may be computed using $W_{h,k}(i) = -\nabla\nabla \log l(y_i|f(x_i))$, i=1, . . . , $N_{od}$, where $\nabla\nabla$ indicates a Laplacian, which is a second order derivative matrix of a logarithm of the likelihood function, $l(y_i|f(x_i))$ is a likelihood function value computed using $f(x_i)$ given $y_i$, and $f(x_i)$ is the latent function value for an $i^{th}$ observation vector $x_i$ of training data subset 414 or training data subset 314. For example, when $$l(y_i | f(x_i)) = \frac{1}{1+e^{-y_i f(x_i)}}, W_{h,k}(i) = \frac{1}{1+e^{-f(x_i)}}\left(1 - \frac{1}{1+e^{-f(x_i)}}\right)$$

for the $i^{th}$ observation vector $x_i$. Usually, $$\pi_i = \frac{1}{1+e^{-f(x_i)}}$$

is used as a probability to predict a '1' for $x_i$, so $W_{h,k}(i) = \pi_i(1-\pi_i)$.

In an operation 714, the $W_{h,k}$ vector is communicated as needed. For example, the $W_{h,k}$ vector is downstream broadcast as described referring to operation 704 based on the indices assigned to each respective worker computer. Also, each $W_{h,k}$ vector is received as described referring to operation 706.

Similar to operation 708, in an operation 716, an $h,k^{th}$ block of a matrix A is computed using $A_{h,k} = I + W_{h,k}^{0.5} K_{h,k} W_{h,k}^{0.5}$, where I is an $N_{od} \times N_{od}$ identity matrix. For example, worker device 400 assigned indices h=1, k=1 computes $A_{1,1} = I + W_{1,1}^{0.5} K_{1,1} W_{1,1}^{0.5}$; worker device 400 assigned worker indices h=2, k=1 computes $A_{2,1} = I + W_{2,1}^{0.5} K_{2,1} W_{2,1}^{0.5}$, worker device 400 assigned worker indices h=2, k=2 computes $A_{2,2} = I + W_{2,2}^{0.5} K_{2,2} W_{2,2}^{0.5}$, and so on.

In operation 718, a Cholesky decomposition matrix L is computed using, for example, L=cholesky (A), where L is a lower triangular matrix that can be split into h, k blocks, $L_{h,k}$, k=1, . . . , h, h=1, . . . , H, where each $L_{h,k}$ block is an $N_{od} \times N_{od}$. The computation of each block of the Cholesky decomposition matrix may be performed based on the indices assigned to each worker computer based on the following algorithm 1, where WC indicates a worker computer having the indicated indices assigned, and communicate indicates the upstream and downstream broadcasting of the indicated block of the Cholesky decomposition matrix L as described referring to operations 704 and 706 based on the indices assigned to each respective worker computer.

1: for i ∈ {1, 2, . . . , H} do in serial
2: On the i, $i^{th}$ WC, $L_{i,i}$=cholesky $(A_{i,i})$
3: On the i, $i^{th}$ WC, communicate $L_{i,i}$
4: Do in parallel on WCj∈ {i+1, . . . , H}
5: On the j, $j^{th}$ WC, $L_{j,i} \Leftarrow L_{i,i}^{-1} A_{j,i}$
6: On the j, $j^{th}$ WC, communicate2 $L_{j,i}$
7: End do in parallel
8: Forj∈ {i+1, . . . , H} do in parallel
9: Do in parallel on WCs l ∈ {j, . . . , H}
10: On the j, $i^{th}$ WC, $A_{j,l} \Leftarrow A_{j,l} - L_{j,i}^T L_{l,i}$
11: End do in parallel
12: End for
13: End for communicate2 indicates a down&right broadcasting of the indicated block of the Cholesky decomposition matrix $L_{j,i}$ based on the indicated index values. For example, each worker device 400 having k=i, broadcasts its Cholesky decomposition matrix $L_{j,i}$ to the right to each worker device having the same index value for h and successive index values for k until k=H. Each worker device 400 having k=i, also broadcasts its Cholesky decomposition matrix $L_{j,i}$ down and to the right to each worker device having successive index values for h until h=H and having k=i+1.

For illustration, when i=1 in line 1 and j=2 in line 4, worker device 400 assigned worker indices h=2, k=1 broadcasts the just computed $L_{2,1} = L_{1,1}^{-1} A_{2,1}$ to the worker computing devices assigned worker indices h=2, k=2 (to the right) and to the worker computing devices assigned worker indices l, k=2 (down and to the right) where l=h+1, . . . , H. As another example, when i=1 in line 1 and j=3 in line 4, worker device 400 assigned worker indices h=3, k=1 broadcasts $L_{3,1} = L_{1,1}^{-1} A_{3,1}$ to the worker computing devices assigned worker indices h, l where l=k+1, . . . , h, and to the worker computing devices assigned worker indices l, k+2 where l=h+1, . . . , H. As another example, when i=1 in line 1 and j=H in line 4, worker device 400 assigned worker indices h=H, k=1 broadcasts $L_{H,1} = L_{1,1}^{-1} A_{H,1}$ to the worker computing devices assigned worker indices h=H, l where l=k+1, . . . , H.

In an operation 720, a $b_{h,k}$ vector is computed based on the likelihood function and has a length $N_{od}$. For example, $b_{h,k}(i) = W_n, k(i) f(x_i) + D_{h,k}(i)$, i=1, 2, . . . , $N_{od}$, where $b_{h,k}(i)$ indicates an $i^{th}$ entry of the $b_{h,k}$ vector, $W_{h,k}(i)$ indicates an $i^{th}$ entry of the $W_{h,k}$ vector, $f(x_i)$ is the latent function value for the $i^{th}$ observation vector $x_i$ of training data subset 414 or training data subset 314, $D_{h,k} = \nabla \log l(y|f(x))$, $\nabla$ indicates a first derivative of a logarithm of the likelihood function, $l(y|f(x))$ is the likelihood function value computed using $f(x)$ given y, and $D_{h,k}(i)$ indicates an $i^{th}$ entry of the $D_{h,k}$ vector computed for the $i^{th}$ observation vector $x_i$ of training data subset 414 or training data subset 314. For example, when $$l(y_i | f(x_i)) = \frac{1}{1+e^{-y_i f(x_i)}}, b_{h,k}(i) = W_{h,k}(i) f(x_i) + \log(1 + e^{-y_i f(x_i)})$$

for the $i^{th}$ observation vector $x_i$.

In an operation 722, the $b_{h,k}$ vector is communicated as needed. For example, the $b_{h,k}$ vector is downstream broadcast as described referring to operation 704 based on the indices assigned to each respective worker computer. Also, each $b_{h,k}$ vector is received as described referring to operation 706.

In an operation 724, a first intermediate vector $R_{h,k}$ is computed based on $R_{h,k} = W_{h,k}^{0.5} K_{h,k} b_{h,k}$ and has a length $N_{od}$. For the computation of $K_{h,k} b_{h,k}$, each worker computer multiplies its block of K with the corresponding segment of b and mapreduces within its block to sum to obtain the rows from (h−1)u+1 to (h−1)u+u of $K_{h,k} b_{h,k}$. For the computation of $W_{h,k}^{0.5} K_{h,k} b_{h,k}$, each worker computer performs an inner product to obtain the segments of $W_{h,k}^{0.5} K_{h,k} b_{h,k}$. For illustration, a function MPI_Reduce with the reduction operator MPI_SUM may be used to perform the mapreduce process in a parallel computing architecture such as using the blocks distributed across the plurality of worker computing devices. The message passing interface (MPI) is used to communicate values as understood by a person of skill in the art.

In an operation 726, a second intermediate vector $Q_{h,k}$ is computed using $Q_{h,k}=L_{h,k}\backslash R_{h,k}$, where $Q_{h,k}$ is an $N_{od}$ length vector, and \ indicates division. $Q_{h,k}$ can be computed using a linear solver such as that shown below where $s_k$ is the linear solver of $L_{h,k}\backslash R_{h,k}$.

1: for h ∈ {1, 2, . . . , H} do in serial
2: for k ∈ {1, 2, . . . , h−1}, on the h,k$^{th}$ WC do in parallel
3: $V'_{h,t} \Leftarrow L_{h,k} s_k$, ∫ or k<h.
4: mapreduce $$v_h \Leftarrow v_h - \sum_{k=1}^{h-1} v'_{h,k}$$

5: End for
6: on the h, h$^{th}$ machine, solve $S_h = L_{h,h}\backslash v_h$ and communicate $s_h$
9: End for In an operation 728, a third intermediate vector $P_{h,k}$ is computed using $P_{h,k}=L_{h,k}^{T}\backslash Q_{h,k}$, where $P_{h,k}$ is an $N_{od}$ length vector, T indicates a transpose, and \ indicates division. $P_{h,k}$ can be computed using the linear solver such as that shown above where $s_k$ is the linear solver of $L_{h,k}\backslash Q_{h,k}$.

In an operation 730, an $a_h$ vector is computed, for example, using $a_h=b_{h,k}-W_{h,k}^{0.5}P_{h,k}$, where an is an $N_{od}$ length vector.

In an operation 732, the latent function vector $f_{h,k}$ is computed using, for example, $f_{h,k}=K_{h,k}a_h$, where $f_{h,k}$ is an $N_{od}$ length vector with one latent function value computed for each observation vector included in training data subset 414 or training data subset 314. On the worker computer having k=1, for each value of h, a mapreduce function is applied to $f_{h,k}$ to compute the segment of the latent function vector $f_h$.

In an operation 734, on the worker computer having k=1 for each value of h, the objective function value $C_h$ is computed using, for example, $$C_h = -0.5 a_h^T f_h + \sum_{i=1}^{N_{od}} \log l(y_i \mid f(x_i)).$$

For example, when $$l(y_i \mid f(x_i)) = \frac{1}{1+e^{-y_i f(x_i)}}, C_h = -0.5 a_h^T f_h - \sum_{i=1}^{N_{od}} \log(1 + e^{-y_i f(x_i)}).$$

In an operation 736, the objective function value $C_h$ is returned to controller device 104 from the worker computer having k=1.

Referring to FIG. 7C, in an operation 750, the request to provide model parameters is received from controller device 104 as a result of operation 616.

In an operation 752, $W_{h,k}$, $D_{h,k}$, and $L_{h,k}$ are returned to controller device 104 or otherwise output for storage in classification model description 224.

The operations of FIGS. 5, 6, and 7A to 7C result in a trained classification model. Information describing the trained classification model may be stored in classification model description 224 by either or both of user device 200 or controller device 104.

Figure 8:
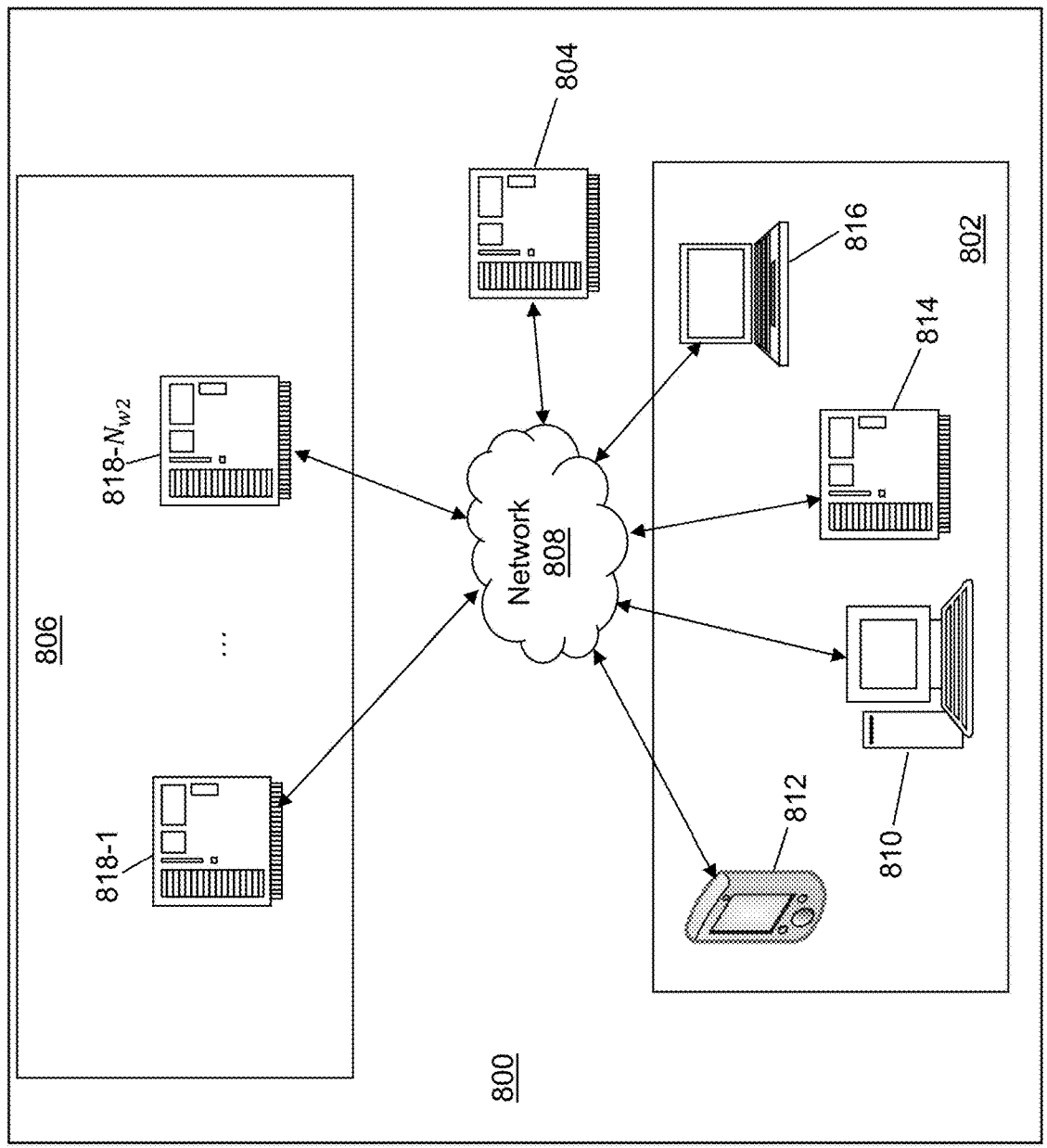
FIG. 8 depicts a block diagram of a classification system in accordance with an illustrative embodiment.

Referring to FIG. 8, a block diagram of a classification system 800 is shown in accordance with an illustrative embodiment. In an illustrative embodiment, classification system 800 may include a second user system 802, a second controller device 804, a second worker system 806, and a second network 808. Classification system 800 uses the trained classification model stored in classification model description 224 to classify data stored in input data that may be distributed across second worker system 806. Classification system 800 and classification model training system 100 may be composed of the same computing devices or otherwise integrated into a single system or may be distinct systems.

Each of second user system 802, second controller device 804, and second worker system 806 may be composed of one or more discrete computing devices in communication through second network 808. Second user system 802 and second controller device 804 may be integrated into a single computing device.

Second network 808 may include one or more networks of the same or different types. Second network 808 can be any type of wired and/or wireless public or private network including a cellular network, a local area network, a wide area network such as the Internet or the World Wide Web, etc. Second network 808 further may comprise sub-networks and consist of any number of communication devices.

The one or more computing devices of second user system 802 may include computing devices of any form factor such as a desktop 810, a smart phone 812, a server computer 814, a laptop 816, a personal digital assistant, an integrated messaging device, a tablet computer, etc. Second user system 802 can include any number and any combination of form factors of computing devices that may be organized into subnets. The computing devices of second user system 802 may send and receive signals through second network 808 to/from another of the one or more computing devices of second user system 802 and/or to/from second controller device 804. The one or more computing devices of second user system 802 may communicate using various transmission media that may be wired and/or wireless as understood by those skilled in the art. The one or more computing devices of second user system 802 may be geographically dispersed from each other and/or co-located.

Figure 9:
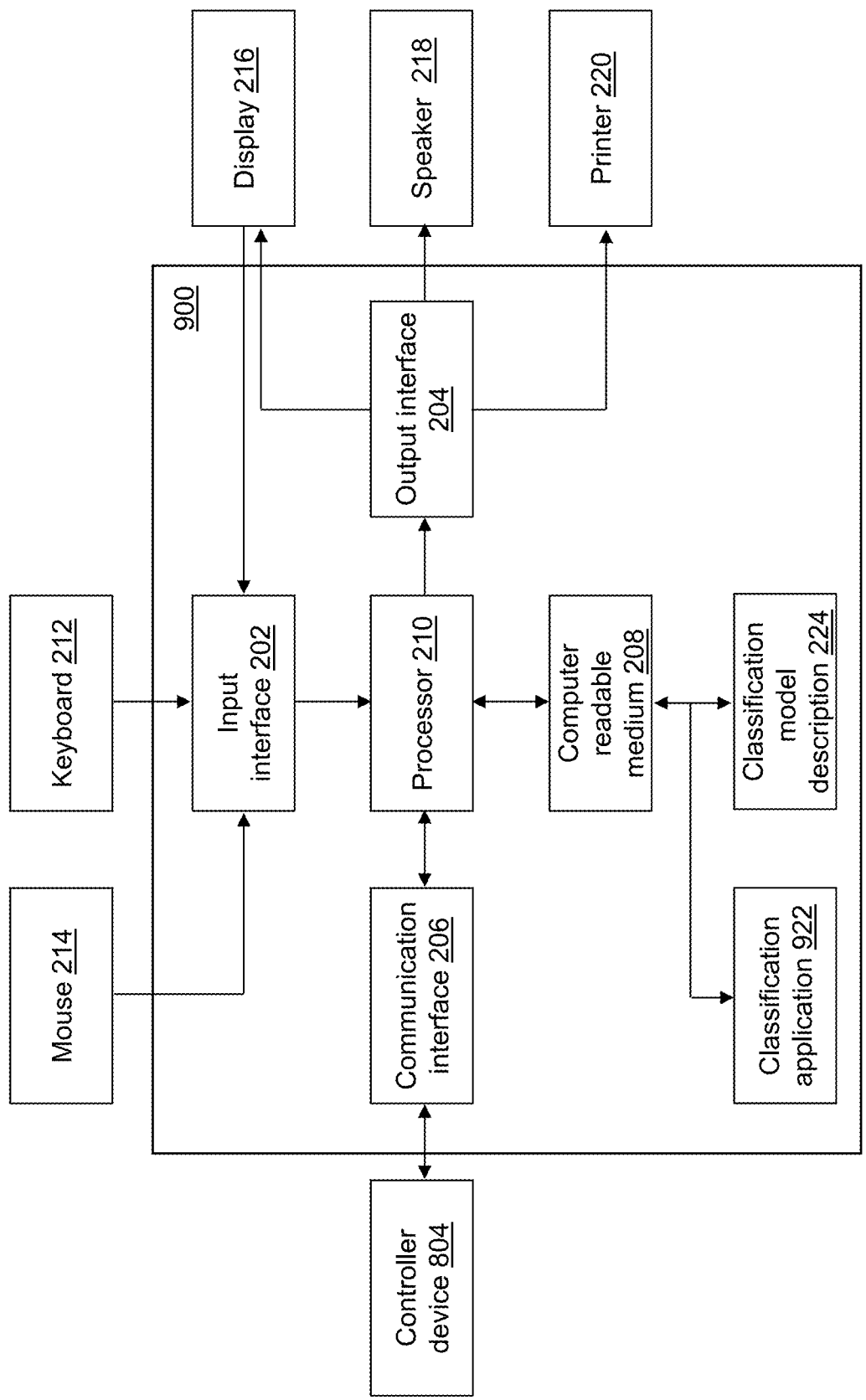
FIG. 9 depicts a block diagram of a user device of the classification system of FIG. 8 in accordance with an illustrative embodiment.

For illustration, referring to FIG. 9, a block diagram of a second user device 900 is shown in accordance with an example embodiment. Second user device 900 is an example computing device of second user system 802. For example, each of desktop 810, smart phone 812, server computer 814, and laptop 816 may be an instance of second user device 900. Similar to user device 200, second user device 900 may include input interface 202, output interface 204, communication interface 206, non-transitory computer-readable medium 208, processor 280, a classification application 922, and classification model description 224. Each computing device of second user system 802 may be executing classification application 922 of the same or different type. Second user device 900 may execute classification application 922 that triggers creation of classification output data for the input data.

Referring again to FIG. 8, second controller device 804 can include any form factor of computing device. For illustration, FIG. 8 represents second controller device 804 as a server computer. Second controller device 804 may send and receive signals through second network 808 to/from second user system 802 and/or to/from second worker system 806. Second controller device 804 may communicate using various transmission media that may be wired and/or wireless as understood by those skilled in the art. Second controller device 804 may be implemented on a plurality of computing devices of the same or different type. Classification system 800 further may include a plurality of controller devices.

Figure 10:
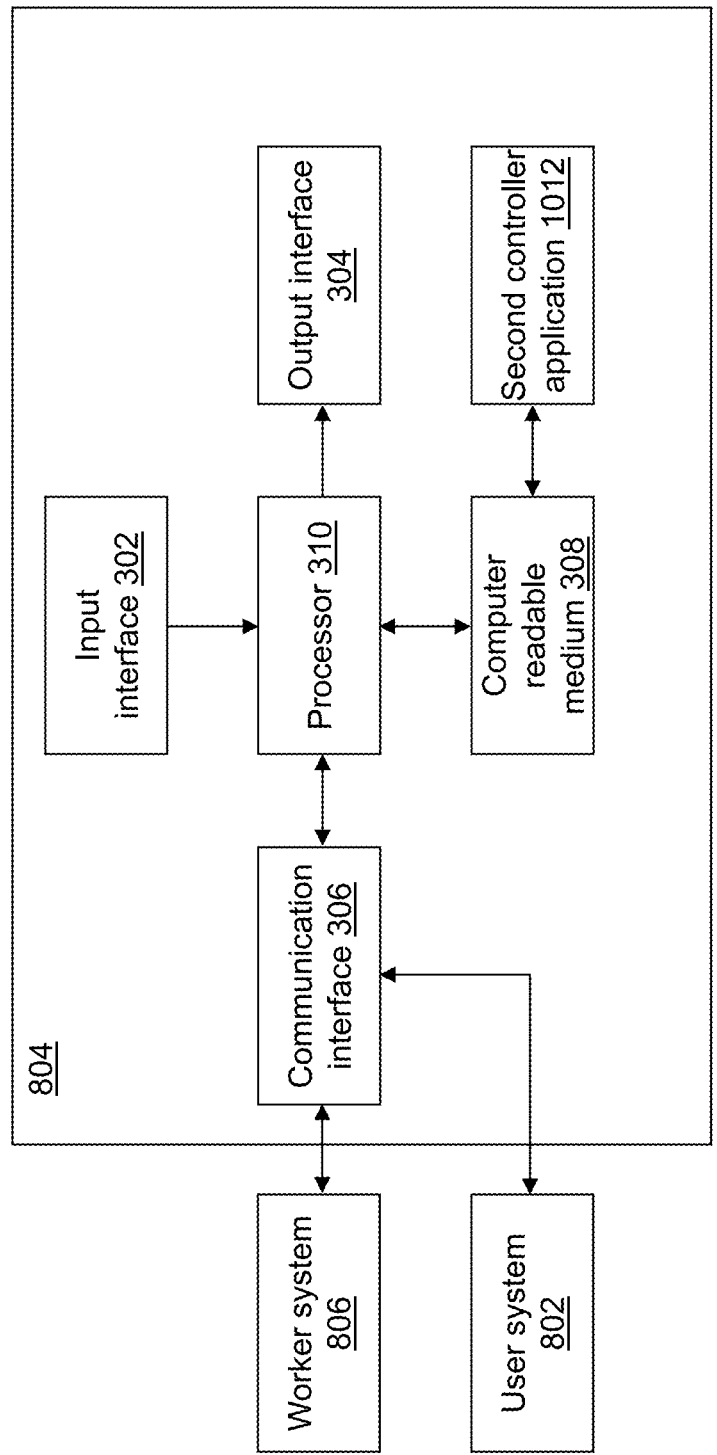
FIG. 10 depicts a block diagram of a controller device of the classification system of FIG. 8 in accordance with an illustrative embodiment.

For illustration, referring to FIG. 10, a block diagram of second controller device 804 is shown in accordance with an illustrative embodiment. Similar to controller device 104, second controller device 804 may include second input interface 302, second output interface 304, second communication interface 306, second computer-readable medium 308, second processor 380, and a second controller application 1012.

Referring again to FIG. 8, the one or more computing devices of second worker system 806 may include computers of any form factor such as a desktop, a server, a laptop, etc. For example, in the illustrative embodiment, second worker system 806 includes a first worker computer 818-1, . . . , and an $N_{w2}^{th}$ worker computer 818-$N_{w2}$. Each worker computer may support use of a plurality of threads. The computing devices of second worker system 806 may send and receive signals through second network 808 to/from second controller device 804 and/or to/from another computing device of second worker system 806. The one or more computing devices of second worker system 806 may be geographically dispersed from each other and/or co-located. The one or more computing devices of second worker system 806 may communicate using various transmission media that may be wired and/or wireless as understood by those skilled in the art.

Figure 11:
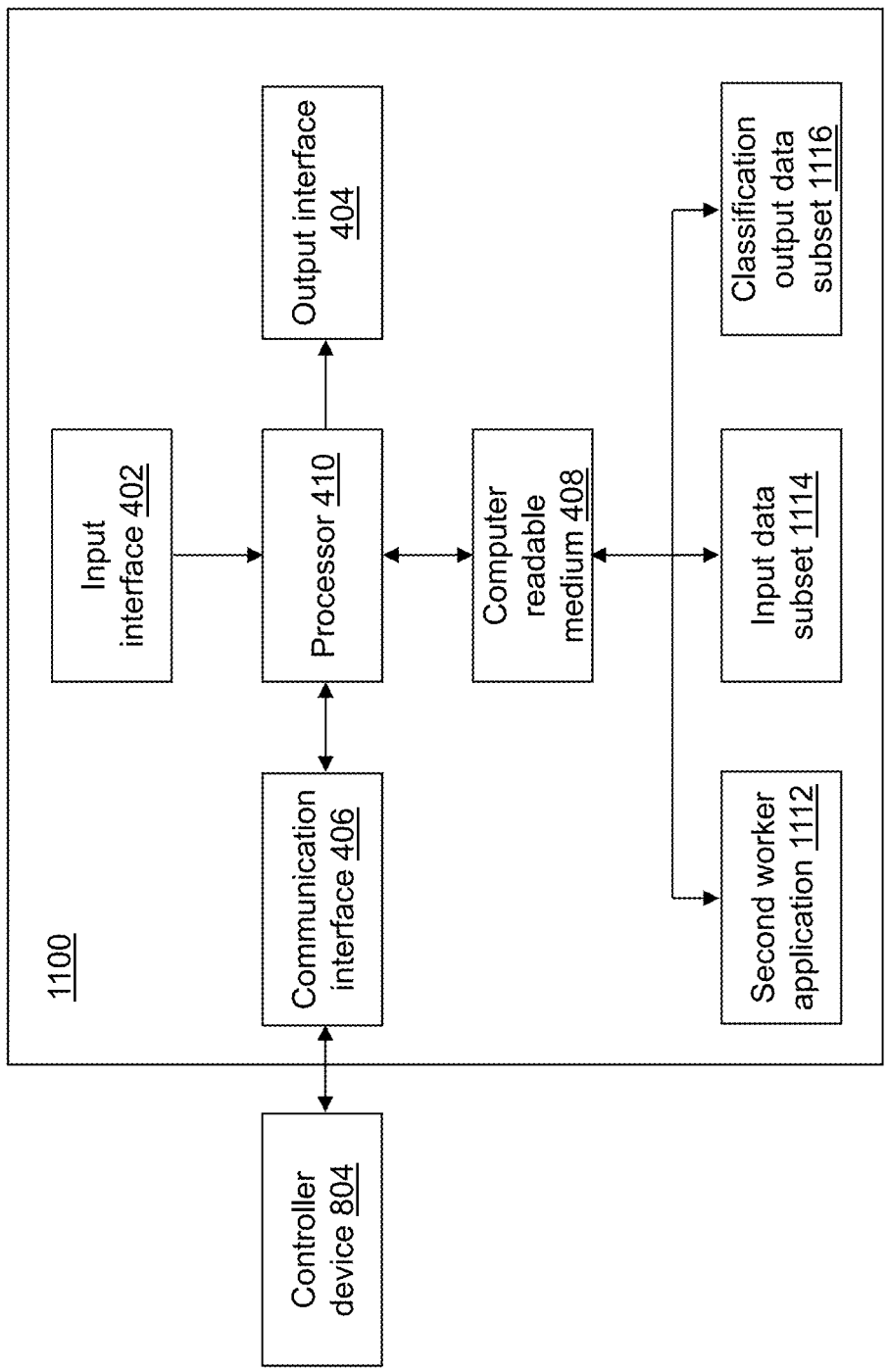
FIG. 11 depicts a block diagram of a worker device of the classification system of FIG. 8 in accordance with an illustrative embodiment.

For illustration, referring to FIG. 11, a block diagram of a second worker device 1100 is shown in accordance with an example embodiment. Second worker device 1100 is an example computing device of second worker system 806. For example, each of first worker computer 818-1, . . . , and $N_{w2}^{th}$ worker computer 818-$N_{w2}$ may be an instance of second worker device 1100. Similar to worker device 400, second worker device 1100 may include third input interface 402, third output interface 404, third communication interface 406, third computer-readable medium 408, third processor 480, a second worker application 1112, an input data subset 1114, a classification output data subset 1116, and a classification model description 224. The input data may be distributed into input data subset 1114 distributed across each second worker device 1100 of second worker system 806. In an alternative embodiment, second controller device 804 may also be used to perform the operations described for each second worker device 1100 with a portion of the input data distributed to second controller device 804.

Referring again to FIG. 9, each second user device 900 of second user system 802 may include the same or different components and combinations of Classification application 922 performs operations associated with classifying observations included in data stored in the input data distributed into input data subset 1114 stored on each second worker device 1100 of second worker system 806. The classification for each observation vector may be stored in a respective classification output data subset 1116. Data describing the trained classification model may be read from classification model description 224 and used to determine each classification. Some or all of the operations described herein may be embodied in classification application 922. The operations may be implemented using hardware, firmware, software, or any combination of these methods.

Referring to the example embodiment of FIG. 9, classification application 922 is implemented in software (comprised of computer-readable and/or computer-executable instructions) stored in computer-readable medium 208 and accessible by processor 280 for execution of the instructions that embody the operations of classification application 922. Classification application 922 may be written using one or more programming languages, assembly languages, scripting languages, etc. Classification application 922 may be implemented as a Web application.

Classification application 922 may be integrated with other analytic tools. As an example, classification application 922 may be part of an integrated data analytics software application and/or software architecture such as that offered by SAS Institute Inc. of Cary, North Carolina, USA. Merely for illustration, classification application 922 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® CAS, SAS/OR®, SAS/ETS®, SAS® Visual Analytics, SAS® Viya™, SAS In-Memory Statistics for Hadoop®, etc.

Referring to FIG. 10, fewer, different, or additional components may be incorporated into second controller device 804. Second controller application 1012 performs operations associated with coordinating the classification based on inputs provided from second user device 900 using the computing devices of second worker system 806. The operations may be implemented using hardware, firmware, software, or any combination of these methods. Referring to the example embodiment of FIG. 10, second controller application 1012 is implemented in software (comprised of computer-readable and/or computer-executable instructions) stored in second computer-readable medium 308 and accessible by second processor 380 for execution of the instructions that embody the operations of second controller application 1012. Second controller application 1012 may be written using one or more programming languages, assembly languages, scripting languages, etc. Second controller application 1012 may be implemented as a Web application.

Second controller application 1012 may be integrated with other analytic tools. As an example, second controller application 1012 may be part of an integrated data analytics software application and/or software architecture. For example, second controller application 1012 may be part of SAS® CAS. Merely for further illustration, second controller application 1012 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, etc.

Referring to FIG. 11, fewer, different, and additional components may be incorporated into second worker device 1100. Each second worker device 1100 of second worker system 806 may include the same or different components or combination of components. Second worker application 1112 may be integrated with other analytic tools. As an example, second worker application 1112 may be part of an integrated data analytics software application and/or software architecture. For example, second worker application 1112 may be part of SAS® CAS. Merely for further illustration, second worker application 1112 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, etc.

Classification application 922, second controller application 1012, and second worker application 1112 may be the same or different applications that are integrated in various manners to classify or otherwise label data stored in the input data. Classification application 922, second controller application 1012, and second worker application 1112 further may be the same or different applications that are integrated in various manners with classification model training application 222, controller application 312, and worker application 412, respectively.

Similar to the training dataset, the input data may include, for example, a plurality of rows and a plurality of columns. The plurality of rows may be referred to as observation vectors or records (observations), and the columns may be referred to as variables. In an alternative embodiment, the input data may be transposed. The plurality of variables define a vector $x_i$ for each observation vector i=1, . . . , Ns, where Ns is a number of the observation vectors included in the input data. The input data may include additional variables that are not included in the plurality of variables. One or more variables of the plurality of variables may describe a characteristic of a physical object. The observations included in the input data are unlabeled or unclassified.

The input data may include data captured as a function of time for one or more physical objects. The data stored in the input data may be captured at different time points periodically, intermittently, when an event occurs, etc. The input data may include data captured at a high data rate such as 200 or more observation vectors per second for one or more physical objects. One or more columns of the input data may include a time and/or date value. The input data may include data captured under normal and abnormal operating conditions of the physical object.

The data stored in the input data may be received directly or indirectly from the source and may or may not be pre-processed in some manner. For example, the data may be pre-processed using an ESPE. For example, data stored in the input data may be generated as part of the IoT.

The data stored in the input data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The input data may be stored in various compressed formats such as a coordinate format, a compressed sparse column format, a compressed sparse row format, etc. The data may be organized using delimited fields, such as comma or space separated fields, fixed width fields, using a SAS® dataset, etc.

The input data may be stored using various data structures as known to those skilled in the art including one or more files of a file system, a relational database, one or more tables of a system of tables, a structured query language database, etc. on second controller device 804 and/or on second worker system 806. Second controller device 804 may coordinate access to the input data that is distributed across second worker system 806 such that each second worker device 1100 stores a subset of the input data. For example, the input data may be stored in a cube distributed across a grid of computers as understood by a person of skill in the art. As another example, the input data may be stored in a multi-node Hadoop® class. As another example, the input data may be stored in a cloud of computers and accessed using cloud computing technologies, as understood by a person of skill in the art. The SAS® LASR™ Analytic Server may be used as an analytic platform to enable multiple users to concurrently access data stored in the input data. The SAS Viya open, cloud-ready, in-memory architecture also may be used as an analytic platform to enable multiple users to concurrently access data stored in the input data. SAS CAS may be used as an analytic server with associated cloud services in SAS Viya. Some systems may be of other types and configurations.

Figure 12:
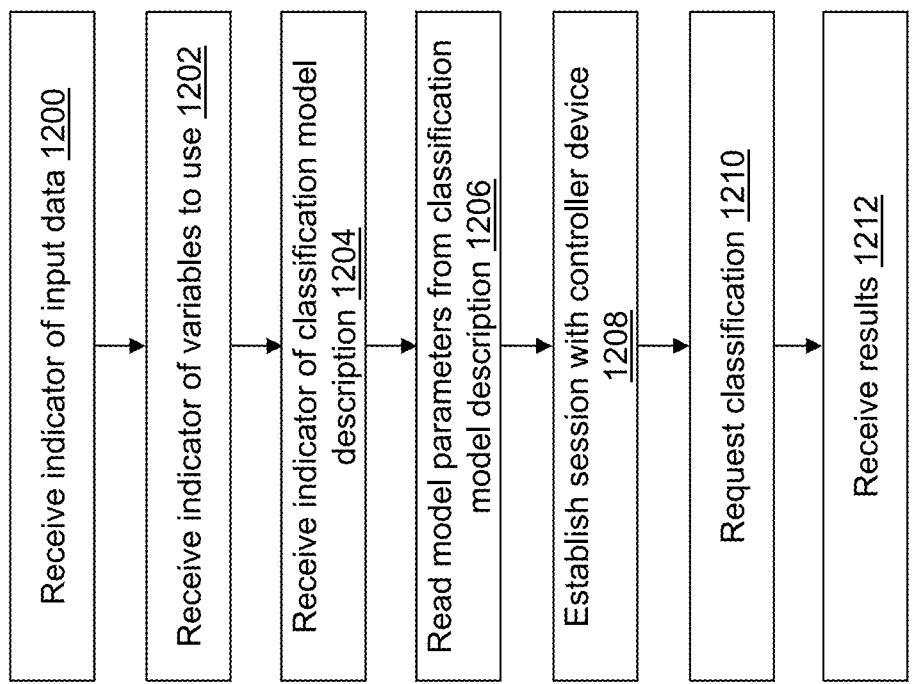
FIG. 12 depicts a flow diagram illustrating examples of operations performed by the user device of FIG. 9 in accordance with an illustrative embodiment.

Referring to FIG. 12, example operations associated with classification application 922 are described. Additional, fewer, or different operations may be performed depending on the embodiment of classification application 922. The order of presentation of the operations of FIG. 12 is not intended to be limiting. Some of the operations may not be performed in some embodiments. Although some of the operational flows are presented in sequence, the various operations may be performed in various repetitions and/or in other orders than those that are illustrated. For example, a user may execute classification application 922, which causes presentation of a first user interface window, which may include a plurality of menus and selectors such as drop-down menus, buttons, text boxes, hyperlinks, etc. associated with classification application 922 as understood by a person of skill in the art. The plurality of menus and selectors may be accessed in various orders.

In an operation 1200, an eighth indicator may be received that indicates the input data. For example, the eighth indicator indicates a location and a name of the input data. As an example, the eighth indicator may be received by classification application 922 after selection from a user interface window or after entry by a user into a user interface window. In an alternative embodiment, the input data may not be selectable. For example, a most recently created dataset may be used automatically.

In an operation 1202, a ninth indicator may be received that indicates the plurality of variables to use in the input data. For example, the ninth indicator may indicate one or more column numbers or one or more column names. As another option, all of the columns of the input data may be assumed to be the plurality of variables. The plurality of variables are the variables that define each observation vector $x_i$.

In an operation 1204, a tenth indicator may be received that indicates classification model description 224. For example, the tenth indicator indicates a location and a name of classification model description 224. As an example, the tenth indicator may be received by classification application 922 after selection from a user interface window or after entry by a user into a user interface window. In an alternative embodiment, classification model description 224 may not be selectable. For example, a classification model description 224 may be stored in a known location and used automatically.

In an operation 1206, global model parameters are read from classification model description 224. For example, the training dataset, the global W vector $W_g$, the global Cholesky decomposition $L_g$, and the global D vector $D_g = \nabla \log l(y_i|f(x_i))$, i=1, 2, . . . , N are read from classification model description 224, where $N_T$ is a number of the observation vectors included in the training dataset. For example, observation vectors created to make the number of observation vectors allocated equal at each worker computer when training may be deleted. The global Cholesky decomposition $L_g$ is an $N_T \times N_T$ matrix. $W_g$ and $D_g$ are $N_T$ dimensional vectors.

In an operation 1208, a session is established with second controller device 804 when second user device 900 and second controller device 804 are not integrated. Second user device 900 accepts commands from a user and relays instructions to second controller device 804 when second user device 900 and second controller device 804 are not integrated. Second controller device 804 establishes a communication network with the worker devices of second worker system 806, sending instructions to each second worker device 1100 of second worker system 806, collecting and aggregating the results of computations from each second worker device 1100 of second worker system 806, and communicating final results to second user device 900.

In an operation 1210, classification of the input data is requested. When second controller device 804 and second user device 900 are integrated in the same computing device, classification is initiated as described further referring to FIG. 13. The request may include zero or more of the values defined for the parameters indicated in operations 1200 to 1204 and those read from classification model description 224 or zero or more of the values may be stored in a memory location known to second controller device 804 when second controller device 804 and second user device 900 are not integrated in the same computing device.

In an operation 1212, results may be received from second controller device 804 when second controller device 804 and second user device 900 are not integrated in the same computing device. As another example, an indicator may be received that indicates that the classification process is complete. For example, one or more output tables may be presented on display 216 when the classification process is complete. As another option, display 216 may present a statement indicating that the classification process is complete. The user can access the output tables in a predefined location.

Figure 13:
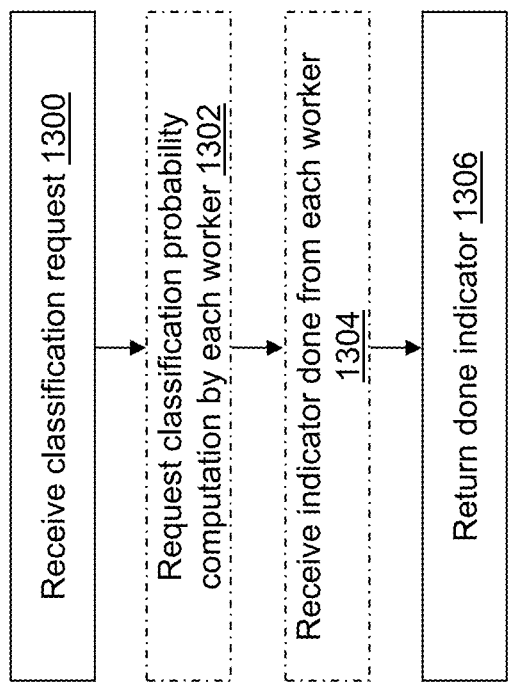
FIG. 13 depicts a flow diagram illustrating examples of operations performed by the controller device of FIG. 10 in accordance with an illustrative embodiment.

Referring to FIG. 13, example operations associated with second controller application 1012 are described. Additional, fewer, or different operations may be performed depending on the embodiment. The order of presentation of the operations of FIG. 13 is not intended to be limiting. Again, second controller application 1012 and classification application 922 may be integrated or be the same applications so that the operations of FIGS. 12 and 13 are merged.

In an operation 1300, the classification request may be received from second user device 900 or directly from the user of second user device 900 when second controller device 804 and second user device 900 are integrated in the same computing device. Values for the parameters indicated in operations 1200 to 1204 and those read from classification model description 224 may be received from second user device 900 or directly from the user of second user device 900 when integrated or may be read from a known storage location. The input data may already be distributed across second worker system 806 into each input data subset 1114. If not, second controller device 804 may request that the input data may be distributed across second worker system 806 into each input data subset 1114.

In an operation 1302, a request is sent to each second worker device 1100 of second worker system 806 to compute a classification probability for each observation vector stored in input data subset 1114 distributed to each second worker device 1100. The request is sent by a controller thread of second controller device 804. Processing by each second worker device 1100 is described in FIG. 14B. The request may include the values for the parameters indicated in operations 1200 to 1204 and those read from classification model description 224 or the values may be provided in a storage location known to each worker device 400 or otherwise provided to each worker device 400.

In an operation 1304, an indicator is received from each second worker device 1100 of second worker system 806 indicating that the classification probability has been computed for each observation vector stored in input data subset 1114.

In an operation 1306, a done indicator is sent to second user device 900 indicating that the classification process is complete.

Figure 14:
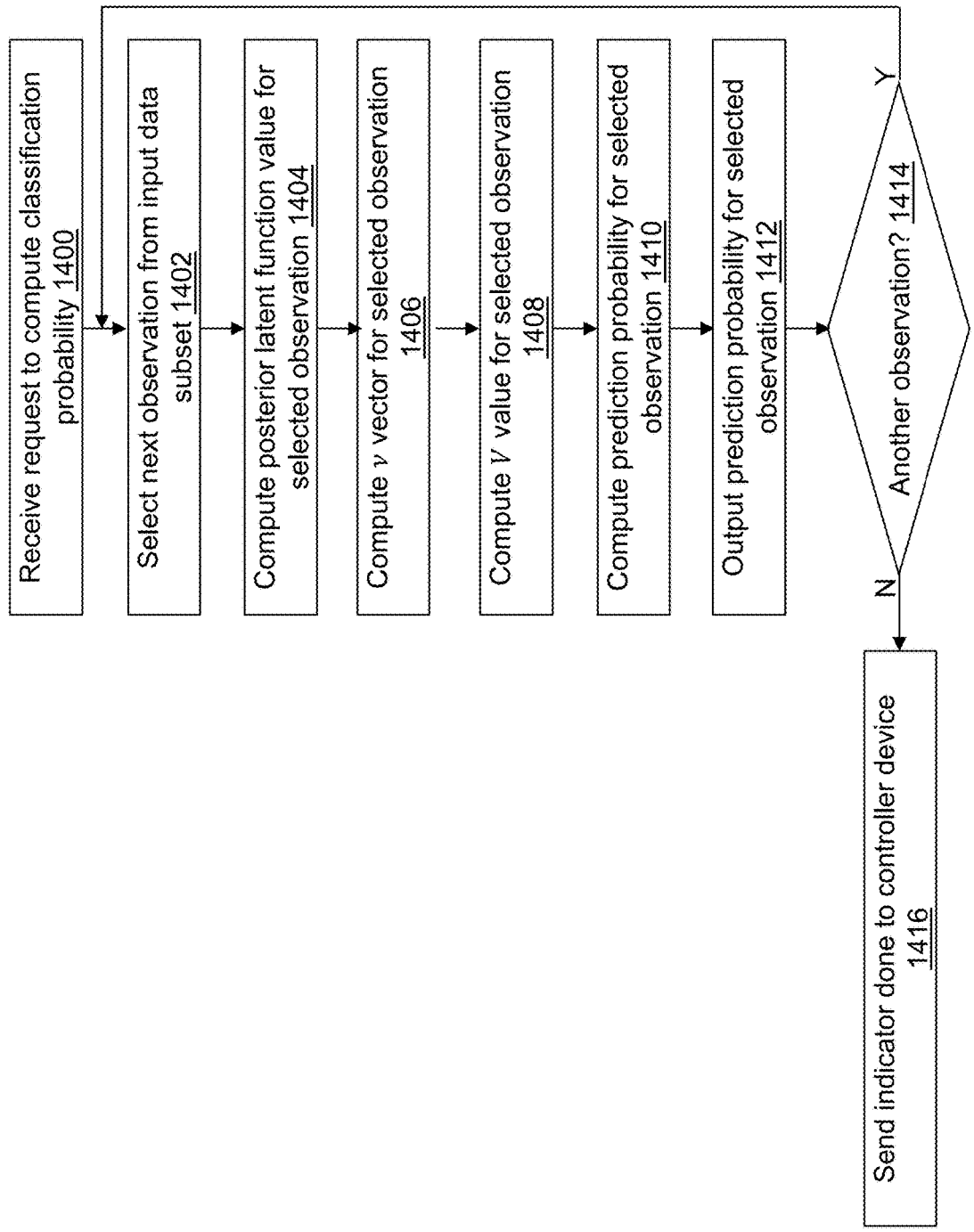
FIG. 14 depicts a flow diagram illustrating examples of operations performed by the worker device of FIG. 11 in accordance with an illustrative embodiment.

Referring to FIG. 14, example operations associated with second worker application 1112 are described. Additional, fewer, or different operations may be performed depending on the embodiment. The order of presentation of the operations of FIG. 14 is not intended to be limiting. When second controller device 804 is acting as a worker device second controller device 804 also executes the operations of FIG. 14 with an assigned input data subset 1114.

Referring to FIG. 14, in an operation 1400, the request to compute the classification probability is received from second controller device 804 as a result of operation 1302.

In an operation 1402, a next observation $x_i$ is selected from input data subset 1114 allocated to the respective second worker device 1100. For example, on a first iteration of operation 1402, a first observation is read from input data subset 1114; on a second of operation 1402, a second observation is read from input data subset 1114; and so on.

In an operation 1404, a posterior latent function value f is computed for the selected next observation using, for example, $f = k^T(x_i) D_g$, where $k(x_i)$ is a vector having length $N_T$ that is a projection of the selected next observation using a kernel bivariate function selected based on the kernel function $K_f$ such as Gaussian, linear, exponential, etc. as $k(x_i) = [K_f(x_i, x_1), K_f(x_i, x_2), \ldots K_f(x_i, X_{N_T})]$, where $X_1$, $x_2, \ldots, X_{N_T}$ are observation vectors read from the training dataset, Nr is a number of observation vectors included in the training dataset read from classification model description 224, and $D_g$ is the global D vector read from classification model description 224.

In an operation 1406, a v vector is computed for the selected next observation using, for example, $v = L_g \backslash (W_g^{0.5} k(x_i))$, where $L_g$ is the global Cholesky decomposition read from classification model description 224, and $W_g$ is the global W vector read from classification model description 224.

In an operation 1408, a V value is computed for the selected next observation using, for example, $V = K_f(x_1, x_i) - v^T v$, where the V value defines a deviation value.

In an operation 1410, a prediction probability value $\pi$ is computed for the selected next observation using, for example, $\pi = \int \sigma(z) N(z|f, V)$ and a Laplacian approximation. The prediction probability value x indicates a probability that the selected next observation belongs to a first of two possible classes. To classify the selected next observation, a threshold such as 0.5 can be applied to select between the two possible classes. For illustration, the computation of prediction probability value $\pi$ is described in a paper by Williams, Christopher K. I. and David Barber, *Bayesian Classification With Gaussian Processes*, IEEE Trans. Pattern Anal. Mach. Intell. 20 1342-1351 (1998). To compute the Gaussian integral over the logistic sigmoid function, an approximation based on an expansion of a sigmoid function in terms of an error function can be used. For illustration, a basis set of five scaled error functions can be used to interpolate the logistic sigmoid at the selected next observation $x_i$. For example, $$\lambda[0] = 0.41$$
$$\lambda[1] = 0.4$$
$$\lambda[2] = 0.37$$
$$\lambda[3] = 0.44$$
$$\lambda[4] = 0.39$$
$$t[0] = 0.0$$
$$t[1] = 0.6$$
$$t[2] = 2.0$$
$$t[3] = 2.5$$
$$t[4] = 4.5$$
$$t[5] = \infty$$

for $i = 0, 1, 2, 3, 4, 5$ for $j = 0, 1, 2, 3, 4$ $$A[i, j] = \frac{\text{erf}(t[i] \times \lambda[j]) + 1}{2}$$

end for $$b[i] = \frac{1}{1 + e^{-t[i]}}$$

end for $$\xi = A^{-1}b$$

for $j = 0, 1, 2, 3, 4$ $$a[j] = \lambda[j]\frac{f}{\sqrt{1 + 2V\lambda^2[j]}}$$

$$r[j] = \text{erf}(a[j])/2$$

end for $$\pi^* = \langle r, \xi \rangle + 0.5$$

where $\langle r, \xi \rangle$ indicates an inner product of r and $\xi$, $\lambda$, $\xi$, $\alpha$, r are vectors with a length of five, b and t are vectors of length six, and A is a matrix of size six by five. $\pi^*$ is a probability that $x_i$ is placed into a Class 1. $\xi$ may be computed only on a first iteration.

In an operation 1412, the prediction probability value It and/or the selected classification are output to classification output data subset 1116. The selected next observation may further be output to classification output data subset 1116 in association with the prediction probability value I and/or the selected classification.

In an operation 1414, a determination is made concerning whether input data subset 1114 includes another observation. If input data subset 1114 includes another observation, processing continues in operation 1402 to select and process the next observation. If input data subset 1114 does not include another observation, processing continues in an operation 1416.

In operation 1416, an indicator that the observations in input data subset 1114 have been classified is sent from second worker device 1100 of second worker system 806 to second controller device 804, and processing continues in operation 1306 of FIG. 13.

Figure 15:
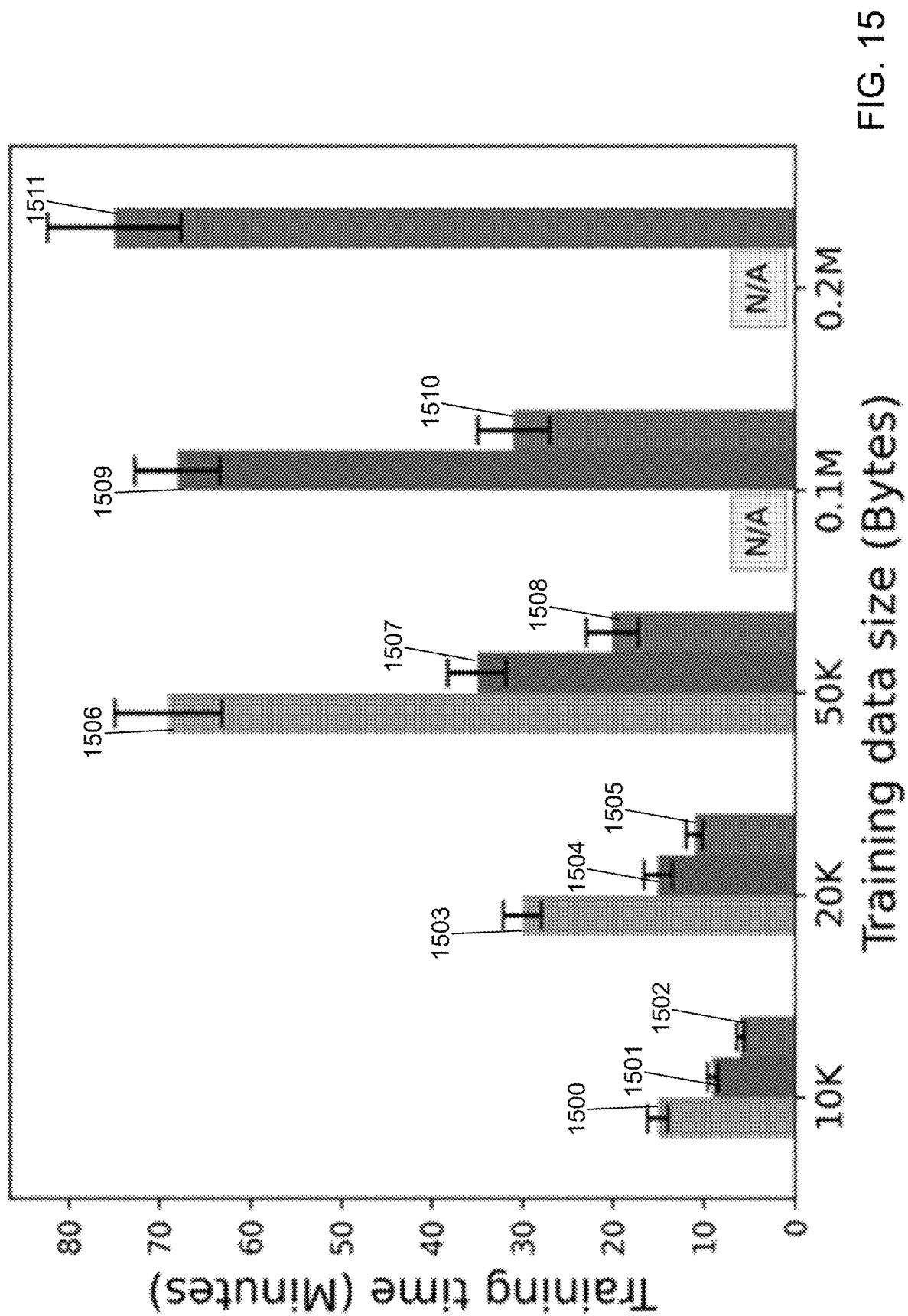
FIG. 15 shows a computing time comparison between the classification model training system of FIG. 1 and two existing classification model training systems using a block size of two and a training dataset with successively increasing numbers of observation vectors in accordance with an illustrative embodiment.
Figure 16:
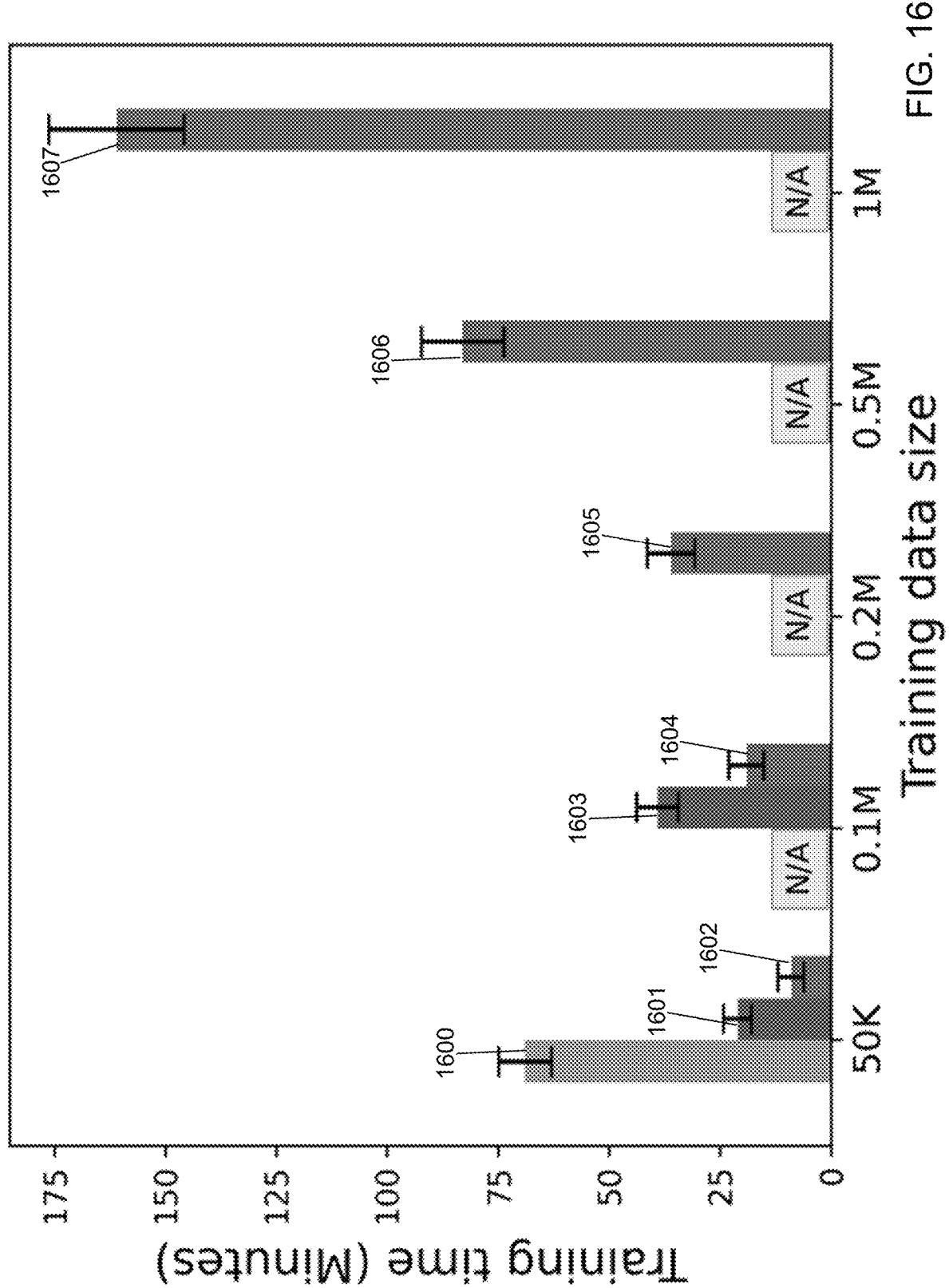
FIG. 16 shows a computing time comparison between the classification model training system of FIG. 1 and the two existing classification model training systems using a block size of five and a training dataset with successively increasing numbers of observation vectors in accordance with an illustrative embodiment.
Figure 17:
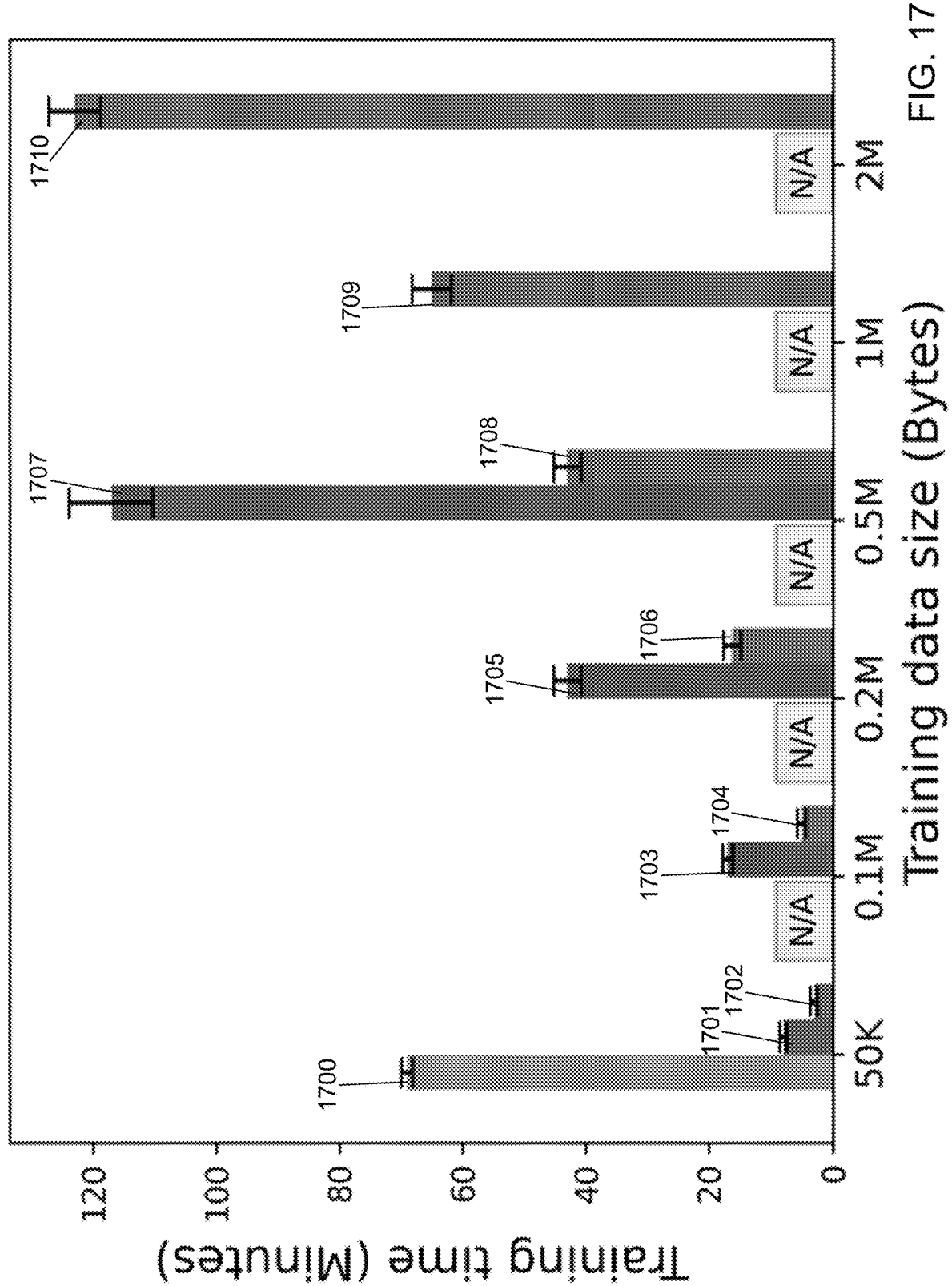
FIG. 17 shows a computing time comparison between the classification model training system of FIG. 1 and the two existing classification model training systems using a block size of ten and a training dataset with successively increasing numbers of observation vectors in accordance with an illustrative embodiment.

Experimental results were generated using the operations of classification model training application 222 with three different block sizes. Referring to FIG. 15, a training time comparison was performed with H=2. The comparison is between classification model training application 222, the classification model training application described in U.S. Pat. No. 11,227,223 (the '223 patent method), and the classification model training application described in U.S. Pat. No. 10,877,277 (the '277 patent method), which issued Dec. 22, 2020 and is assigned to assigned to the assignee of the present application. Referring to FIG. 16, a training time comparison was performed with H=5. Referring to FIG. 17, a training time comparison was performed with H=10. A dataset with successively increasing numbers of observation vectors was used for each comparison. The experiments were conducted using a computing grid with a central controller and H $(H_1)/2$ workers. The controller had 72 CPUs with a base frequency of 2.3 gigahertz (GHz), and each worker had 32 CPUs of 2.7 GHZ. Each application was executed 10 times to compute an average training time that is included in FIGS. 15, 16, and 17. In all cases, the accuracy that resulted for the same size dataset was the same.

Referring to FIG. 15, a first bar 1500 represents a computation time using the '277 patent method with 10,000 observations. A second bar 1501 represents a computation time using the '223 patent method with 10,000 observations. A third bar 1502 represents a computation time using classification model training application 222 with 10,000 observations.

A fourth bar 1503 represents a computation time using the '277 patent method with 20,000 observations. A fifth bar 1504 represents a computation time using the '223 patent method with 20,000 observations. A sixth bar 1505 represents a computation time using classification model training application 222 with 20,000 observations.

A seventh bar 1506 represents a computation time using the '277 patent method with 50,000 observations. An eighth bar 1507 represents a computation time using the '223 patent method with 50,000 observations. A ninth bar 1508 represents a computation time using classification model training application 222 with 50,000 observations.

A tenth bar 1509 represents a computation time using the '223 patent method with 100,000 observations. An eleventh bar 1510 represents a computation time using classification model training application 222 with 100,000 observations. Executing the '277 patent method with 100,000 observations was unsuccessful as the computers ran out of memory.

A twelfth bar 1511 represents a computation time using classification model training application 222 with 200,000 observations. Executing the '277 patent method and the '223 patent method with 200,000 observations was unsuccessful as the computers ran out of memory.

Referring to FIG. 16, a first bar 1600 represents a computation time using the '277 patent method with 50,000 observations. A second bar 1601 represents a computation time using the '223 patent method with 50,000 observations. A third bar 1602 represents a computation time using classification model training application 222 with 50,000 observations.

A fourth bar 1603 represents a computation time using the '223 patent method with 100,000 observations. A fifth bar 1604 represents a computation time using classification model training application 222 with 100,000 observations. Executing the '277 patent method with 100,000 observations was unsuccessful as the computers ran out of memory.

A sixth bar 1605 represents a computation time using classification model training application 222 with 200,000 observations. Executing the '277 patent method and the '223 patent method with 200,000 observations was unsuccessful as the computers ran out of memory.

A seventh bar 1606 represents a computation time using classification model training application 222 with 500,000 observations. Executing the '277 patent method and the '223 patent method with 500,000 observations was unsuccessful as the computers ran out of memory.

An eighth bar 1607 represents a computation time using classification model training application 222 with 1,000,000 observations. Executing the '277 patent method and the '223 patent method with 1,000,000 observations was unsuccessful as the computers ran out of memory.

Referring to FIG. 17, a first bar 1700 represents a computation time using the '277 patent method with 50,000 observations. A second bar 1701 represents a computation time using the '223 patent method with 50,000 observations. A third bar 1702 represents a computation time using classification model training application 222 with 50,000 observations.

A fourth bar 1703 represents a computation time using the '223 patent method with 100,000 observations. A fifth bar 1704 represents a computation time using classification model training application 222 with 100,000 observations. Executing the '277 patent method with 100,000 observations was unsuccessful as the computers ran out of memory.

A sixth bar 1705 represents a computation time using the '223 patent method with 200,000 observations. A seventh bar 1706 represents a computation time using classification model training application 222 with 200,000 observations. Executing the '277 patent method with 200,000 observations was unsuccessful as the computers ran out of memory.

An eighth bar 1707 represents a computation time using the '223 patent method with 500,000 observations. A ninth bar 1708 represents a computation time using classification model training application 222 with 500,000 observations. Executing the '277 patent method with 500,000 observations was unsuccessful as the computers ran out of memory.

A tenth bar 1609 represents a computation time using classification model training application 222 with 1,000,000 observations. Executing the '277 patent method and the '223 patent method with 1,000,000 observations was unsuccessful as the computers ran out of memory.

An eleventh bar 1710 represents a computation time using classification model training application 222 with 2,000,000 observations. Executing the '277 patent method and the '223 patent method with 2,000,000 observations was unsuccessful as the computers ran out of memory.

There are applications for classification model training application 222 and classification application 922 in many areas such as process control and equipment health monitoring, image processing and classification, data segmentation, data analysis, etc. Classification model training application 222 and classification application 922 provide efficient distributed and parallel computing device implementations for training and using classification models based on GPC processing with LA inference. The presented results demonstrate identical accuracy with significantly faster computing times and application to big data that cannot be stored on a single computing device.

The explosion of digital data is generating many opportunities for big data analytics, which in turn provides many opportunities for training classification models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by each computing device of a plurality of worker computing devices cause each computing device to:

receive a first worker index and a second worker index from a controller device, wherein the first worker index and the second worker index together uniquely identify a segment of a lower triangular matrix, wherein the first worker index has a value from one to a predefined block size value, H, wherein the second worker index has a value from one to the predefined block size value, H, wherein a number of the plurality of worker computing devices is determined based on the predefined block size value, H, wherein the number is divided into H blocks, wherein each block of the H blocks comprises one or more of the plurality of worker computing devices, and wherein all of the one or more of the plurality of worker computing devices in the each block have a same value of the first worker index and a different value of the second worker index;

in response to receipt of a first computation request from the controller device, access a training data subset distributed to the computing device, wherein the training data subset is a subset of a training dataset, wherein the training dataset is divided into the H blocks, wherein the training dataset in each of the H blocks is distributed as the training data subset to all of the one or more of the plurality of worker computing devices that are in the each block of the H blocks such that all of the plurality of worker computing devices that share the same first worker index have the same training data subset;

send the accessed training data subset to at least one worker computing device of the plurality of worker computing devices having a higher value for the first worker index;

receive the training data subset sent from at least one worker computing device of the plurality of worker computing devices having a lower value of the first worker index;

responsive to determining that the first worker index equals the second worker index, compute a first kernel matrix block for the accessed training data subset using a predefined kernel function, wherein the first kernel matrix block is computed between observation vectors included in the accessed training data subset; and responsive to determining that the first worker index does not equal the second worker index, compute the first kernel matrix block for the received training data subset using the predefined kernel function, wherein the first kernel matrix block is computed between observation vectors included in the accessed training data subset and the received training data subset, wherein the first kernel matrix block defines an h,k$^{th}$ block of a kernel matrix, wherein h indicates the first worker index, and k indicates the second worker index;

(A) in response to receipt of a second computation request from the controller device, compute a first vector using the defined h,k$^{th}$ block of the kernel matrix;

compute a latent function vector using the defined h,k$^{th}$ block of the kernel matrix and the computed first vector;

compute an objective function value using the computed first vector, the computed latent function vector, and a likelihood function value computed for each observation vector included in the accessed training data subset; and send the computed objective function value to the controller device;

wherein (A) is repeated until the controller device determines training of a classification model is complete; and output model parameters for the trained classification model, wherein the model parameters are computed from the likelihood function value computed for each observation vector included in the accessed training data subset.

2. The non-transitory computer-readable medium of claim 1, wherein the kernel function is a polynomial kernel function.

3. The non-transitory computer-readable medium of claim 1, wherein the likelihood function is a sigmoid function.

4. The non-transitory computer-readable medium of claim 1, wherein the likelihood function is $$\frac{1}{1+e^{-y_i f(x_i)}},$$

where $x_i$ is an i$^{th}$ observation vector included in the accessed training data subset, $y_i$ is a target variable value of the i$^{th}$ observation vector, and $f(x_i)$ is a value included in the computed latent function vector for the i$^{th}$ observation vector.

5. The non-transitory computer-readable medium of claim 1, wherein, responsive to determining that the first worker index equals the second worker index and the predefined kernel function is a Gaussian kernel function, the first kernel matrix block is computed using $$K_{h,k}(x_i, x_j) = \exp\frac{-\|x_i - x_j\|^2}{2s^2} \quad i = 1, \ldots, N, j = 1, \ldots N,$$

where $K_{h,k}$ is the first kernel matrix block, $x_i$ is an i$^{th}$ observation vector of the accessed training data subset, $x_j$ is a j$^{th}$ observation vector of the accessed training data subset, N is a number of observation vectors included in the accessed training data subset, and s is a Gaussian bandwidth parameter value.

6. The non-transitory computer-readable medium of claim 1, wherein, responsive to determining that the first worker index does not equal the second worker index and the predefined kernel function is a Gaussian kernel function, the first kernel matrix block is computed using $$K_{h,k}(x_i, x_j) = \exp\frac{-\|x_i - x_j\|^2}{2s^2} \quad i = 1, \ldots, N, j = 1, \ldots N,$$

where $K_{h,k}$ is the first kernel matrix block, $x_i$ is an i$^{th}$ observation vector of the accessed training data subset, $x_j$ is a j$^{th}$ observation vector of the received training data subset, N is a number of observation vectors included in the accessed training data subset, and s is a Gaussian bandwidth parameter value.

7. The non-transitory computer-readable medium of claim 1, wherein, responsive to determining that the first worker index equals the second worker index, the latent function vector is computed using $f=Ka$, where $f$ is the latent function vector having a latent function value for each observation vector included in the accessed training data subset, K is the computed first kernel matrix block, and a is the computed first vector having a value for each observation vector included in the accessed training data subset.

8. The non-transitory computer-readable medium of claim 1, wherein, responsive to determining that the first worker index does not equal the second worker index, the latent function vector is computed using $f=Ka$, where $f$ is the latent function vector having a latent function value for each observation vector included in the received training data subset, K is the computed first kernel matrix block, and a is the computed first vector having a value for each observation vector included in the received training data subset.

9. The non-transitory computer-readable medium of claim 1, wherein, responsive to determining that the first worker index equals the second worker index, the objective function value is computed using $$C = -0.5a^T f + \sum_{i=1}^{N} \log l(y_i | f(x_i)),$$

where C is the objective function value, a is the computed first vector having a value for each observation vector included in the accessed training data subset, $x_i$ is an i$^{th}$ observation vector included in the accessed training data subset, $y_i$ is a target variable value of the i$^{th}$ observation vector, $f(x_i)$ is a value included in the computed latent function vector for the i$^{th}$ observation vector, $l(y_i|f(x_i))$ is a likelihood function value computed using a predefined likelihood function $l(\ )$ and N is a number of observation vectors included in the accessed training data subset.

10. The non-transitory computer-readable medium of claim 1, wherein, responsive to determining that the first worker index does not equal the second worker index, the objective function value is computed using $$C = -0.5a^T f + \sum_{i=1}^{N} \log l(y_i | f(x_i)),$$

where C is the objective function value, a is the computed first vector having a value for each observation vector included in the received training data subset, $x_i$ is an $i^{th}$ observation vector included in the received training data subset, $y_i$ is a target variable value of the $i^{th}$ observation vector, $f(x_i)$ is a value included in the computed latent function vector for the $i^{th}$ observation vector, $l(y_i|f(x_i))$ is a likelihood function value computed using a predefined likelihood function l( ) and N is a number of observation vectors included in the received training data subset.

11. The non-transitory computer-readable medium of claim 1, wherein the controller device sums the objective function value computed by each computing device of the plurality of worker computing devices having the second worker index equal to one to determine that training of the classification model is complete.

12. The non-transitory computer-readable medium of claim 11, wherein an objective function change value $\Delta C$ is computed using $\Delta C = |C_g - C_{g,p}|$, where $C_{g,p}$ is the summed objective function value computed from a prior iteration of (A), and $C_g$ is the summed objective function value computed from a current iteration of (A).

13. The non-transitory computer-readable medium of claim 12, wherein training of the classification model when is stopped responsive to determining that $\Delta C < Th$, where Th is a predefined convergence threshold.

14. The non-transitory computer-readable medium of claim 1, wherein in (A), and before computing the first vector, the computer-readable instructions further cause each computing device to:
   compute a third vector for the accessed training data subset using $W_{h,k}(i) = -\nabla\nabla \log l(y_i|f(x_i))$, $i=1, \ldots, N$, where $\nabla\nabla$ indicates a second order derivative, $x_i$ is an $i^{th}$ observation vector included in the accessed training data subset, $y_i$ is a target variable value of the $i^{th}$ observation vector, $f(x_i)$ is a value included in the computed latent function vector for the $i^{th}$ observation vector, $l(y_i|f(x_i))$ is a likelihood function value computed using the predefined likelihood function (( ) and N is a number of observation vectors included in the accessed training data subset;
   send the computed third vector to the at least one worker computing device of the plurality of worker computing devices having the higher value for the first worker index; and
   receive the computed third vector sent by the at least one worker computing device of the plurality of worker computing devices having the lower value of the first worker index.

15. The non-transitory computer-readable medium of claim 14, wherein in (A), and before computing the first vector and after computing the third vector, the computer-readable instructions further cause each computing device to:
   compute an A matrix block using $A_{h,k} = I + W_{h,k}^{0.5} K_{h,k} W_{h,k}^{0.5}$, where $A_{h,k}$ is the A matrix block, I is an N×N identity matrix, and $K_{h,k}$ is the first kernel matrix block.

16. The non-transitory computer-readable medium of claim 15, wherein in (A), and before computing the first vector and after computing the A matrix block, the computer-readable instructions further cause each computing device to:
   compute a Cholesky decomposition matrix using L=cholesky (A) where cholesky indicates computation of a Cholesky decomposition of A.

17. The non-transitory computer-readable medium of claim 16, wherein, responsive to determining that the first worker index equals the second worker index, computing the Cholesky decomposition matrix comprises:
   computing an h,$k^{th}$ block of the Cholesky decomposition matrix using $L_{h,k}$=cholesky $(A_{h,k})$;
   when the second worker index equals one, sending the computed h,$k^{th}$ block of the Cholesky decomposition matrix to the at least one worker computing device of the plurality of worker computing devices having the higher value for the first worker index; and
   receiving the computed h,$k^{th}$ block of the Cholesky decomposition matrix sent by the at least one worker computing device of the plurality of worker computing devices having the lower value of the first worker index.

18. The non-transitory computer-readable medium of claim 17, wherein computing the Cholesky decomposition matrix further comprises:
   computing the h,$k^{th}$ block of the Cholesky decomposition matrix using $L_{h,k} = L_{h,h}^{-1} A_{j,h}$, j=h+1, \ldots, H;
   sending the computed h,$k^{th}$ block of the Cholesky decomposition matrix to any worker computing device having a common value for the first worker index; and
   sending the computed h,$k^{th}$ block of the Cholesky decomposition matrix to any worker computing device having a higher value for the first worker index, if any, and a value of k+1 for the second worker index.

19. The non-transitory computer-readable medium of claim 18, wherein
   computing the h,$k^{th}$ block of the Cholesky decomposition matrix is performed in parallel at each computing device having the common value for the second worker index.

20. The non-transitory computer-readable medium of claim 18, wherein computing the Cholesky decomposition matrix further comprises:
   updating the A matrix block using $A_{j,l} = A_{j,l} - L_{j,h}^T L_{l,h}$, j=j, \ldots, H, where T indicates a matrix transpose.

21. The non-transitory computer-readable medium of claim 20, wherein updating the A matrix block is performed in parallel at each computing device having the common value for the second worker index.

22. The non-transitory computer-readable medium of claim 16, wherein in (A), and before computing the first vector and after computing the Cholesky decomposition matrix, the computer-readable instructions further cause each computing device to:
   compute a fourth vector for the accessed training data subset using $$b_{h,k}(i) = W_{h,k}(i) f(x_i) + \nabla \log l(y_i|f(x_i)), i=1,2,\ldots,N,$$

where $b_{h,k}(i)$ indicates an $i^{th}$ entry of the fourth vector, $W_{h,k}(i)$ indicates an $i^{th}$ entry of the $W_{h,k}$ vector, and $\nabla$ indicates a first derivative;
   sending the computed fourth vector to any worker computing device having the higher value for the first worker index; and
   receiving the computed fourth vector sent by any lower index worker computing device.

23. The non-transitory computer-readable medium of claim 22, wherein in (A), and before computing the first vector and after computing the fourth vector, the computer-readable instructions further cause each computing device to:
   multiply the first matrix block by the computed fourth vector; and mapreduce from each computing device having a common value of the first worker index to sum to obtain rows of $J=K_{h,k}b_{h,k}$.

24. The non-transitory computer-readable medium of claim 23, wherein in (A), and before computing the first vector and after mapreducing, the computer-readable instructions further cause each computing device to:
compute a first intermediate vector $R_{h,k}$ using $R_{h,k}=W_{h,k}^{0.5}J$.

25. The non-transitory computer-readable medium of claim 24, wherein in (A), and before computing the first vector and after computing the first intermediate vector, the computer-readable instructions further cause each computing device to:
compute a second intermediate vector using $Q_{h,k}=L_{h,k} \backslash R_{h,k}$ and a linear solver, where $Q_{h,k}$ indicates the second intermediate vector.

26. The non-transitory computer-readable medium of claim 25, wherein in (A), and before computing the first vector and after computing the second intermediate vector, the computer-readable instructions further cause each computing device to:
compute a third intermediate vector using $P_{h,k}=L_{h,k} \backslash Q_{h,k}$ and the linear solver, where $P_{h,k}$ indicates the third intermediate vector.

27. The non-transitory computer-readable medium of claim 26, wherein the first vector is computed using $a_h=b_{h,k}-W_{h,k}^{0.5}P_{h,k}$, where $a_h$ is the computed first vector.

28. The non-transitory computer-readable medium of claim 26, wherein the model parameters are $W_{h,k}$, $k=1,\ldots,h$, $h=1,\ldots,H$, $D_{h,k}$, $k=1,\ldots,h$, $h=1,\ldots,H$, and $L_{h,k}$, $k=1,\ldots,h$, $h=1,\ldots,H$, where $D_{h,k}=\nabla\log l(y|f(x))$.

29. A system comprising:
a plurality of worker computing devices, wherein each computing device of the plurality of worker computing devices comprises
a processor; and
a non-transitory computer-readable medium having stored thereon computer-readable instructions that when executed by each computing device cause each computing device to
receive a first worker index and a second worker index from a controller device, wherein the first worker index and the second worker index together uniquely identify a segment of a lower triangular matrix, wherein the first worker index has a value from one to a predefined block size value, H, wherein the second worker index has a value from one to the predefined block size value, H, wherein a number of the plurality of worker computing devices is determined based on the predefined block size value, H, wherein the number is divided into H blocks, wherein each block of the H blocks comprises one or more of the plurality of worker computing devices, and wherein all of the one or more of the plurality of worker computing devices in the each block have a same value of the first worker index and a different value of the second worker index;
in response to receipt of a first computation request from the controller device,
access a training data subset distributed to the computing device, wherein the training data subset is a subset of a training dataset, wherein the training dataset is divided into the H blocks, wherein the training dataset in each of the H blocks is distributed as the training data subset to all of the one or more of the plurality of worker computing devices that are in the each block of the H blocks such that all of the plurality of worker computing devices that share the same first worker index have the same training data subset;
send the accessed training data subset to at least one worker computing device of the plurality of worker computing devices having a higher value for the first worker index;
receive the training data subset sent from at least one worker computing device of the plurality of worker computing devices having a lower value of the first worker index;
responsive to determining that the first worker index equals the second worker index, compute a first kernel matrix block for the accessed training data subset using a predefined kernel function, wherein the first kernel matrix block is computed between observation vectors included in the accessed training data subset; and
responsive to determining that the first worker index does not equal the second worker index, compute the first kernel matrix block for the received training data subset using the predefined kernel function, wherein the first kernel matrix block is computed between observation vectors included in the accessed training data subset and the received training data subset, wherein the first kernel matrix block defines an h,k$^{th}$ block of a kernel matrix, wherein h indicates the first worker index, and k indicates the second worker index;
(A) in response to receipt of a second computation request from the controller device,
compute a first vector using the defined h,k$^{th}$ block of the kernel matrix;
compute a latent function vector using the defined h,k$^{th}$ block of the kernel matrix and the computed first vector;
compute an objective function value using the computed first vector, the computed latent function vector, and a likelihood function value computed for each observation vector included in the accessed training data subset; and
send the computed objective function value to the controller device;
wherein (A) is repeated until the controller device determines training of a classification model is complete; and
output model parameters for the trained classification model, wherein the model parameters are computed from the likelihood function value computed for each observation vector included in the accessed training data subset.

30. A method of distributed training of a classification model, the method comprising:
receiving, by a computing device, a first worker index and a second worker index from a controller device, wherein the first worker index and the second worker index together uniquely identify a segment of a lower triangular matrix, wherein the first worker index has a value from one to a predefined block size value, H, wherein the second worker index has a value from one to the predefined block size value, H, wherein a number of the plurality of worker computing devices is determined based on the predefined block size value, H, wherein the number is divided into H blocks, wherein each block of the H blocks comprises one or more of the plurality of worker computing devices, and wherein all of the one or more of the plurality of worker computing devices in the each block have a same value of the first worker index and a different value of the second worker index;

in response to receipt of a first computation request from the controller device, accessing, by the computing device, a training data subset distributed to the computing device, wherein the training data subset is a subset of a training dataset, wherein the training dataset is divided into the H blocks, wherein the training dataset in each of the H blocks is distributed as the training data subset to all of the one or more of the plurality of worker computing devices that are in the each block of the H blocks such that all of the plurality of worker computing devices that share the same first worker index have the same training data subset;

sending, by the computing device, the accessed training data subset to at least one worker computing device of the plurality of worker computing devices having a higher value for the first worker index;

receiving, by the computing device, the training data subset sent from at least one worker computing device of the plurality of worker computing devices having a lower value of the first worker index;

responsive to determining that the first worker index equals the second worker index, computing, by the computing device, a first kernel matrix block for the accessed training data subset using a predefined kernel function, wherein the first kernel matrix block is computed between observation vectors included in the accessed training data subset; and responsive to determining that the first worker index does not equal the second worker index, computing, by the computing device, the first kernel matrix block for the received training data subset using the predefined kernel function, wherein the first kernel matrix block is computed between observation vectors included in the accessed training data subset and the received training data subset, wherein the first kernel matrix block defines an h,$k^{th}$ block of a kernel matrix, wherein h indicates the first worker index, and k indicates the second worker index;

(A) in response to receipt of a second computation request from the controller device, computing, by the computing device, a first vector using the defined h,$k^{th}$ block of the kernel matrix;

computing, by the computing device, a latent function vector using the defined h, $k^{th}$ block of the kernel matrix and the computed first vector;

computing, by the computing device, an objective function value using the computed first vector, the computed latent function vector, and a likelihood function value computed for each observation vector included in the accessed training data subset; and sending, by the computing device, the computed objective function value to the controller device;

wherein (A) is repeated until the controller device determines training of a classification model is complete; and outputting, by the computing device, model parameters for the trained classification model, wherein the model parameters are computed from the likelihood function value computed for each observation vector included in the accessed training data subset.

* * * * *

UNITED STATES PATENT AND TRADEMARK OFFICE
CERTIFICATE OF CORRECTION

PATENT NO. : 12,175,374 B1
APPLICATION NO. : 18/635410
DATED : December 24, 2024
INVENTOR(S) : Yingjian Wang et al.

It is certified that error appears in the above-identified patent and that said Letters Patent is hereby corrected as shown below:

In the Specification

Column 18, Line 16:
Delete the phrase "N, blocks" and replace with --$N_r$ blocks--.

Column 28, Line 42:
Delete the phrase "Nr" and replace with --$N_T$--.

Column 29, Line 5:
Delete the phrase "observation x ¿." and replace with --observation $x_i$.--.

In the Claims

Claim 12, Column 35, Line 19:
Delete the phrase "$\Delta C = |C_g - C_{g,p}$," and replace with --$\Delta C = |C_g - C_{g,p}|$,--.

Claim 13, Column 35, Lines 24-25:
Delete the phrase "model when is stopped" and replace with --model is stopped--.

Claim 14, Column 35, Line 39:
Delete the phrase "likelihood function (()" and replace with --likelihood function $l()$,--.

Claim 15, Column 35, Lines 55-56:
Delete the phrase "$A_{h,k} = I + W_{h,k}{}^{0.5} K_{h,k} W_{h,k}{}^{0.5}$," and replace with ----.

Claim 17, Column 36, Line 5:
Delete the phrase "when the second worker index equals one, sending the" and replace with --sending the--.

Signed and Sealed this
Twentieth Day of May, 2025

Coke Morgan Stewart
*Acting Director of the United States Patent and Trademark Office*

CERTIFICATE OF CORRECTION (continued)
U.S. Pat. No. 12,175,374 B1

Claim 18, Column 36, Line 20:
Delete the phrase "$L_{h,k} = L_{h,h} - 1A_{j,h}, j = h + 1, \ldots, H;$" and replace with
--$L_{h,k} = L_{h,h}^{-1} A_{j,h}, j = h + 1, \ldots, H;$--.

Claim 20, Column 36, Lines 38-39:
Delete the phrase "$A_{j,l} = A_{j,l} - L_{j,h}^T L_{l,h}, j == j, \ldots, H,$ where" and replace with
--$A_{j,l} = A_{j,l} - L_{j,h}^T L_{l,h}, j = h + 1, \ldots, H, l = j, \ldots, H,$ where--.

Claim 24, Column 37, Lines 8-9:
Delete the phrase "$R_{h,k} = W_{h,k}{}^{0.5} J.$" and replace with --$R_{h,k} = W_{h,k}^{0.5} J$--.

Claim 26, Column 37, Line 23:
Delete the phrase "$P_{h,k} = L_{h,k} \backslash Q_{h,k}$" and replace with --$P_{h,k} = L_{h,k}^T \backslash Q_{h,k}$--.

Claim 27, Column 37, Line 27-28:
Delete the phrase "$a_h = b_{h,k} - W_{h,k}{}^{0.5} P_{h,k},$" and replace with --$a_h = b_{h,k} - W_{h,k}^{0.5} P_{h,k},$--.